United States Patent
Mizoguchi et al.

(10) Patent No.: US 11,052,489 B2
(45) Date of Patent: Jul. 6, 2021

(54) METHOD FOR LASER PROCESSING

(71) Applicant: AMADA HOLDINGS CO., LTD., Kanagawa (JP)

(72) Inventors: Yuya Mizoguchi, Kanagawa (JP); Hiroaki Ishiguro, Kanagawa (JP); Ryohei Ito, Kanagawa (JP); Ryo Kobayashi, Kanagawa (JP); Kenji Masuda, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/651,550

(22) PCT Filed: Oct. 5, 2018

(86) PCT No.: PCT/JP2018/037371
§ 371 (c)(1),
(2) Date: Mar. 27, 2020

(87) PCT Pub. No.: WO2019/070055
PCT Pub. Date: Apr. 11, 2019

(65) Prior Publication Data
US 2020/0254570 A1  Aug. 13, 2020

(30) Foreign Application Priority Data

Oct. 6, 2017 (JP) .............................. JP2017-195965
Oct. 16, 2017 (JP) .............................. JP2017-200048
Sep. 26, 2018 (JP) .............................. JP2018-180518

(51) Int. Cl.
*B23K 26/38* (2014.01)
*B23K 26/14* (2014.01)
(Continued)

(52) U.S. Cl.
CPC .......... *B23K 26/38* (2013.01); *B23K 26/1436* (2015.10); *B23K 26/1476* (2013.01);
(Continued)

(58) Field of Classification Search
CPC ............ B23K 2101/18; B23K 2103/02; B23K 26/08; B23K 26/142; B23K 26/1436;
(Continued)

(56) References Cited

U.S. PATENT DOCUMENTS 4,638,145 A * 1/1987 Sakuma .............. B23K 26/0853
219/121.61
5,818,009 A * 10/1998 Nakata ............... B23K 26/1476
219/121.84
(Continued)

FOREIGN PATENT DOCUMENTS

DE   10 2007 024366 A1   11/2008
EP      0411535 A2     2/1991
(Continued)

OTHER PUBLICATIONS

English Translation of WO 2016093053 A1 (Year: 2014).*
(Continued)

*Primary Examiner* — Tu B Hoang
*Assistant Examiner* — Tiffany T Tran
(74) *Attorney, Agent, or Firm* — Greenblum & Bernstein, P.L.C.

(57) ABSTRACT

In a laser processing method, laser lights of fiber lasers or direct diode lasers is irradiated onto an iron-based plate material from a nozzle, a nozzle with a nozzle opening whose opening diameter is preliminarily set according to a thickness of the plate material is selected from plural nozzles whose nozzle openings have different opening diameters from each other, and the plate material is cut while irradi-
(Continued)

ating the laser lights onto the plate material and injecting assist gas from the nozzle opening toward the plate material.

9 Claims, 17 Drawing Sheets

(51) Int. Cl.
*B23K 26/40* (2014.01)
*B23K 101/18* (2006.01)
*B23K 103/02* (2006.01)

(52) U.S. Cl.
CPC .......... *B23K 26/1482* (2013.01); *B23K 26/40* (2013.01); *B23K 2101/18* (2018.08); *B23K 2103/02* (2018.08)

(58) Field of Classification Search
CPC ............ B23K 26/1462; B23K 26/1476; B23K 26/1482; B23K 26/38; B23K 26/40; B23K 26/14; B23K 26/70; B23K 2201/18; B23K 2203/04; B23K 26/0648; B23K 26/0665; B23K 26/073; B23K 26/00
USPC .......... 219/68, 121.5, 121.51, 121.54, 121.6, 219/121.61
See application file for complete search history.

(56) References Cited

U.S. PATENT DOCUMENTS

| | | | |
|---|---|---|---|
| 6,335,507 B1* | 1/2002 | Nakata | B23K 26/0665 219/121.67 |
| 10,118,256 B2 | 11/2018 | Ishiguro et al. | |
| 2005/0035093 A1* | 2/2005 | Yamaguchi | B23K 10/00 219/121.39 |
| 2005/0263508 A1* | 12/2005 | Yamazaki | B23K 26/1482 219/121.84 |
| 2012/0031883 A1* | 2/2012 | Kumamoto | B23K 26/38 219/121.78 |
| 2013/0112668 A1* | 5/2013 | Tweitmann | B23K 26/14 219/121.6 |
| 2015/0014889 A1* | 1/2015 | Goya | B23K 26/0869 264/400 |
| 2016/0207144 A1* | 7/2016 | Narita | B23K 26/0617 |
| 2017/0136578 A1* | 5/2017 | Yoshimura | B23K 26/144 |

FOREIGN PATENT DOCUMENTS

| | | |
|---|---|---|
| JP | 5-84590 A | 4/1993 |
| JP | 2015-213939 A | 12/2015 |
| JP | 5919356 B2 | 5/2016 |
| JP | 2017-109238 A | 6/2017 |
| JP | 2017-131897 A | 8/2017 |
| WO | 2010/137475 A1 | 12/2010 |
| WO | 2016/093053 A1 | 6/2016 |
| WO | 2017/145518 A1 | 8/2017 |

OTHER PUBLICATIONS

International Search Report issued in International Patent Application No. PCT/JP2018/037371, dated Jan. 8, 2019.
Written Opinion (PCT/ISA/237) issued in International Bureau of WIPO Patent Application No. PCT/JP2018/037371, dated Jan. 8, 2019.
Decision to Grant a Patent (Office Action) issued in Japan Patent Appl. No. 2018-180518, dated Jul. 23, 2019, along with an English translation thereof.
Notice of Reasons for Refusal (Office Action) issued in Japan Patent Appl. No. 2018-180518, dated Jan. 8, 2019, along with an English translation thereof.
Oct. 29, 2020 Extended European Search Report in European Application No. 18864583.2.

* cited by examiner

METHOD FOR LASER PROCESSING

TECHNICAL FIELD

The present invention relates to a method and an apparatus for laser processing.

BACKGROUND ART

A Patent Documents 1 and 2 disclose a laser processing apparatus that cuts a workpiece by fiber lasers or direct diode lasers in conjunction with assist gas. In the laser processing method disclosed in the Patent Document 2, laser cutting is done while a nozzle gap, which is a distance between the workpiece and a nozzle tip end, is kept at a predetermined value by the laser processing apparatus provided with a so-called tracking device. In addition, a Patent Document 3 discloses an apparatus in which nitrogen-rich gas, generated from air by using of a porous membrane such as a hollow fiber membrane, is supplied to a laser processing head as assist gas.

PRIOR ART DOCUMENT

Patent Document

Patent Document 1: Japanese Granted Patent Publication No. 5919356

Patent Document 2: Japanese Patent Application Publication No. 2017-131897

Patent Document 3: Japanese Patent Application Publication No. H5-084590

SUMMARY OF INVENTION

In a case where an iron-based (including stainless steel) plate-shaped workpiece is laser-cut by fiber lasers or direct diode lasers while nitrogen gas is used as assist gas AG, the workpiece can be cut at higher speed than by $CO_2$ lasers if the workpiece is a relatively thin plate. The reason is that fiber lasers and direct diode lasers have a higher absorption with a short wavelength in regard to a material than $CO_2$ lasers. Therefore, laser cutting using fiber lasers and direct diode lasers provides less consumption of assist gas than using $CO_2$ lasers, and thereby reduces costs.

On the other hand, if the workpiece is a thick plate (for example, the thick plate about more than 6 mm made of SUS304 is cut by 6 kW fiber lasers), it tends to take higher costs than that by using $CO_2$ lasers at the present time. It is assumed as a cause that a cut kerf made by fiber lasers and direct diode lasers is narrower than that made by $CO_2$ lasers and thereby ejection of melted metal becomes harder as the workpiece becomes thicker. Therefore, it is needed to inject assist gas at higher pressure with fiber lasers and direct diode lasers than that with the $CO_2$ lasers in order to facilitate the ejection of the melted metal, and thereby its large consumption of assist gas increases costs.

In laser-cutting an iron-based plate-shaped workpiece, it is needed to avoid formation of an oxide film on a cut surface of a cut-out product. Therefore, anoxic cutting is generally done by using relatively expensive highly pure nitrogen gas as assist gas and injecting the nitrogen gas at high pressure more than 1.0 MPa, and this also causes high costs. In addition, high pressure injection of assist gas requires a pressure boosting equipment, and this also causes high costs. As explained above, laser-cutting with fiber lasers and direct diode lasers tends to cause high costs when cutting an iron-based plate-shaped workpiece, and thereby it is desired to reduce the costs.

An object of the present invention is to provide a method and an apparatus for laser processing that can cut an iron-based thick plate material at lower costs.

A first aspect of the present invention provides a laser processing method comprising: irradiating laser lights of fiber lasers or direct diode lasers from a nozzle to an iron-based plate material; selecting a nozzle to be used that has a nozzle opening with an opening diameter preliminarily set according to a thickness of the plate material from a plurality of nozzles whose nozzle openings have different opening diameters from each other; and cutting the plate material by injecting assist gas from the nozzle opening while irradiating the laser lights onto the plate material.

A second aspect of the present invention provides a laser processing apparatus comprising: a nozzle that is provided with a nozzle opening for injecting assist gas while irradiating laser lights; a laser oscillator that supplies the laser lights to be irradiated from the nozzle opening by fiber lasers or direct diode lasers; an assist-gas supply device that supplies the assist gas to be injected from the nozzle opening; a memory storage that stores a nozzle selection table indicating correspondence relations between plural thicknesses of an iron-based plate material and opening diameters of the nozzle opening preliminarily set in association with the thicknesses; and a nozzle selector that selects a nozzle with the nozzle opening having an opening diameter associated with a thickness of a plate material to be cut next with referring to the nozzle selection table stored in the memory storage.

DESCRIPTION OF EMBODIMENTS

[Embodiment 1]

A laser processing apparatus 51 and a laser processing method according to an embodiment 1 will be explained. In following explanations, a plate material whose thickness t is not smaller than 6 mm is called as a thick plate material. In addition, a plate material whose thickness t is not smaller than 3 mm and smaller than 6 mm is called as a modestly-thick plate material.

Figure 1:
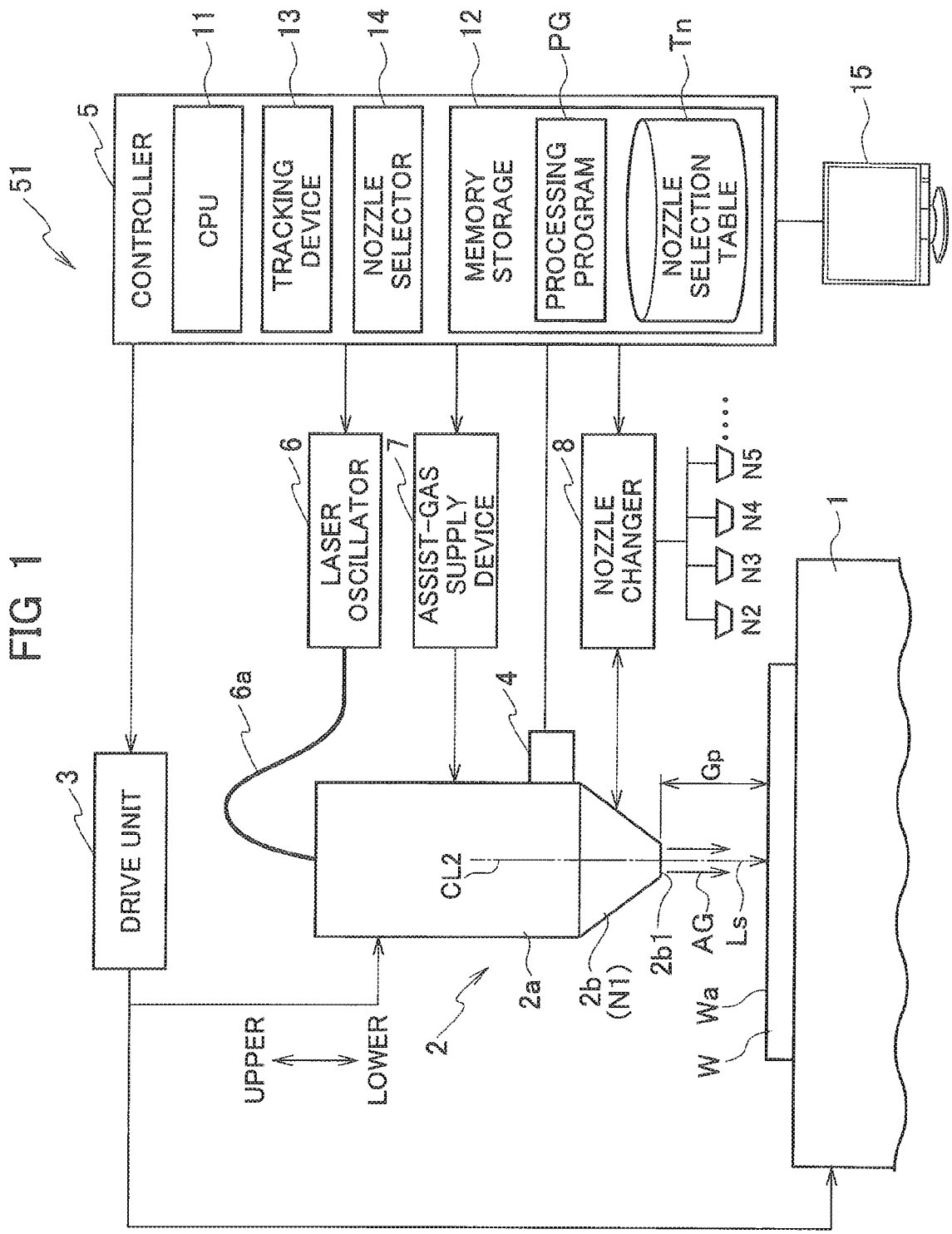
FIG. 1 is a schematic configurational diagram of a laser processing apparatus 51 according to an embodiment 1.

As shown in FIG. 1, the laser processing apparatus 51 includes a work table 1, a processing head 2, a drive unit 3 and a controller 5. A workpiece W that is an iron-based plate material is laid on the work table 1. The processing head 2 irradiates laser lights Ls onto the workpiece W laid on the work table 1. The drive unit 3 moves at least one of the work table 1 and the processing head 2 to change three-dimensional relative position between the two. The controller 5 controls operations of the processing head 2 and the drive unit 3.

In addition, the laser processing apparatus 51 includes a laser oscillator 6 and an assist-gas supply device 7. The laser oscillator 6 supplies the laser lights Ls to the processing head 2 through a process fiber 6$a$. The laser oscillator 6 outputs the laser lights Ls having a so-called 1 μm-band (900 nm-1100 nm) wavelength to supply them to the processing head 2. The assist-gas supply device 7 supplies nitrogen gas to the processing head 2 as the assist gas AG. For example, the assist-gas supply device 7 supplies 99.999% pure nitrogen gas to the processing head 2 by use of a tank of the nitrogen gas. Therefore, the processing head 2 supplies the assist gas AG for so-called anoxic cutting to a cut surface(s).

The processing head 2 includes a main body 2$a$, a nozzle 2$b$ and a sensor 4. The main body 2$a$ is formed to have a hollow-cylindrical shape having an axial line CL2 extending in a vertical direction in an operated state of the processing head 2. The nozzle 2$b$ is detachably attached to a lower end of the main body 2$a$. The sensor 4 measures a gap Gp (a distance between a tip end 2$b$1 of the nozzle 2$b$ and a surface Wa of the workpiece W laid on the work table 1).

Further, the laser processing apparatus 51 includes a nozzle changer 8 for automatically changing the nozzle(s) 2$b$. Nozzles having nozzle numbers N1 to N5 can be stocked in the nozzle changer 8 of the present embodiment. The nozzle changer 8 is controlled by a nozzle selector 14 (explained later in detail) of the controller 5, and attaches a nozzle having a specified number to the main body 2$a$ or removes it therefrom.

Figure 2:
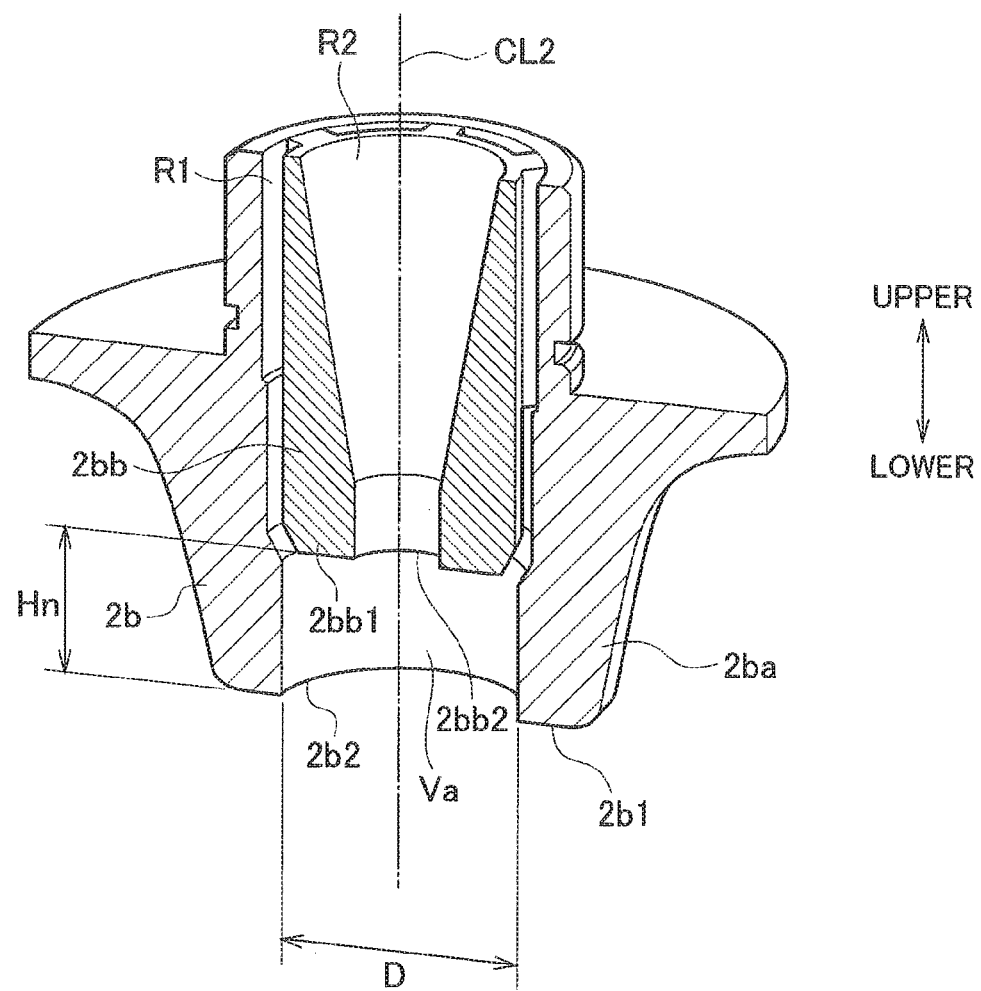
FIG. 2 is a perspective cross-sectional view of a nozzle 2b installed in the laser processing apparatus 51.

As shown in FIG. 2, the nozzle 2$b$ is a so-called double nozzle having an outer nozzle 2$ba$ and an inner nozzle 2$bb$. The nozzle 2$b$ is detachably installed to a lower portion of the main body 2$a$ by screws.

An opening 2$b$2 is formed as a nozzle opening at the tip end 2$b$1 of the outer nozzle 2$ba$, and an opening 2$bb$2 is formed at a tip end 2$bb$1 of the inner nozzle 2$bb$. The tip end 2$bb$1 of the inner nozzle 2$bb$ is made deep-set from the tip end 2$b$1 of the outer nozzle 2$ba$ along the axial line CL2 of the nozzle 2$b$. Namely, the tip end 2$bb$1 positions inside the opening 2$b$2. A hollow-cylindrical space Va having an opening diameter D as its inner diameter is formed between an opening edge of the outer nozzle 2$ba$ and the tip end 2$bb$1.

A distance between the tip end 2$bb$1 and the tip end 2$b$1 in a direction of the axial line CL2 will be called a nozzle height difference Hn. The nozzle height difference Hn is 5.5 mm, for example. An outer flow passage R1 of the assist gas, whose horizontal cross-sectional shape is almost annular, is formed between the outer nozzle 2$ba$ and the inner nozzle 2$bb$. An inner flow passage R2 is formed in the inner nozzle 2$bb$. The inner flow passage R2 is formed such that its inner diameter is made narrower as being lower.

The assist gas AG (nitrogen gas) is supplied from the assist-gas supply device 7 to the main body 2$a$. The supplied assist gas AG flows through the outer flow passage R1 and the inner flow passage R2 and then joins in the space Va, and is injected downward from the opening 2$b$2 of the tip end 2$b$1 as shown in FIG. 1. A gas pressure Pn (explained later in detail) of the assist gas AG is controlled as a pressure in the main body 2$a$ by the assist-gas supply device 7 under the controller 5. The laser lights Ls supplied from the laser oscillator 6 to the main body 2$a$ travels coincidently with the axial line CL2, and then pass through a collimation lens and a focus lens (both of them are not shown in the drawings) provided in the main body 2$a$ and further pass through the inside of the inner flow passage R2 to be irradiated downward from the opening 2$b$2.

As shown in FIG. 1, the controller 5 is configured by including a central processing unit (CPU) 11, a memory storage 12, a tracking control unit 13 and the nozzle selector 14. A processing program(s) PG for cutting the workpiece W and a nozzle selection table (explained later in detail) are preliminarily made and supplied to the controller 5 from outside via a communication interface (not shown in the drawings) or the like, or directly input to the controller 5 by an operator and then stored in the memory storage 12. In laser-cutting, the CPU 11 controls operations of the laser oscillator 6 and the drive unit 3 such that the laser lights Ls are irradiated onto the workpiece W along a cutting path specified by the processing program PG. The above-mentioned gap Gp is maintained by the tracking control unit 13 that controls vertical motions of the processing head 2 done by the drive unit 3 based on detection results of the sensor 4. Note that the tracking control unit 13 and the nozzle selector 14 are operated integrally with the CPU 11 as the controller 5.

In a case of using the assist gas AG when cutting the workpiece W by the laser lights Ls, the CPU 11 controls supply operations of the assist gas AG done by the assist-gas supply device 7. The supplied assist gas AG is injected downward from the opening 2b2 of the nozzle 2b as explained above.

The nozzle selection table Tn is also stored in the memory storage 12. A table 1 shown below offers an example of the nozzle selection table Tn. In the nozzle selection table Tn, a nozzle(s) that is available and should be selected among nozzles with the nozzle numbers N1 to N5, which have the different opening diameters D, is specified in association with the thickness t of the workpiece W to be processed and an output power M of the laser lights Ls. Namely, the nozzle 2b that should be selected (the nozzle number N1 to N5) can be specified based on the nozzle selection table Tn in association with the thickness t of the workpiece W to be processed and an output power M of the laser lights Ls. Note that the nozzle No. 5 is not allocated in the example shown in the Table 1.

TABLE 2

| | | Workpiece thickness (mm) | | | | | | | |
|---|---|---|---|---|---|---|---|---|---|
| | | 6.0 | 8.0 | 10.0 | 12.0 | 16.0 | 20.0 | 25.0 | 30.0 |
| Laser output power M (kW) | 4 | N1 | N1 | N2 | N3 | N3 | — | — | — |
| | 6 | N1 | N1 | N1 | N2 | N3 | N3 | — | — |
| | 9 | N1 | N1 | N1 | N1 | N3 | N3 | N3 | N4 |

According to each setting of the thickness t, the output power M and the nozzle 2b (the opening diameter D) in the nozzle selection table Tn, the workpiece W that is a thick plate material can get good cutting even when the assist gas AG is injected at a low gas pressure Pn. When cutting the workpiece W by the laser processing apparatus 51, the setting of the nozzle selection table Tn is preliminarily confirmed. Hereinafter, a method for making the nozzle selection table Tn and its technical meaning will be explained with reference to FIG. 3 to FIG. 8.

Figure 3:
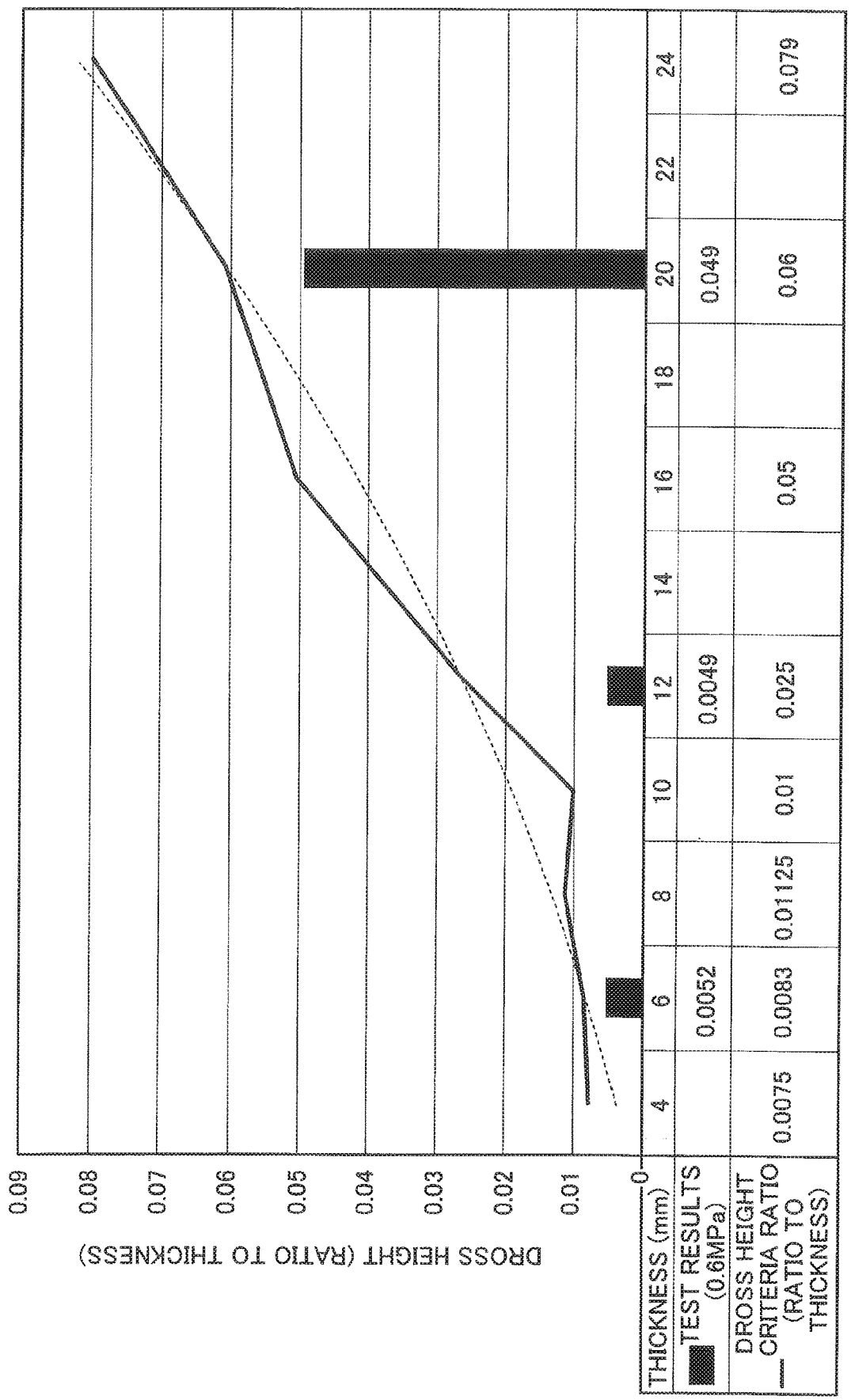
FIG. 3 is a graph explaining cutting performance evaluation criteria.

First, laser-cutting performance evaluation of the workpiece W will be explained with reference to FIG. 3. The cutting performance is evaluated based on a downward protruded height (a dross size) of a dross from a surface opposite to the processing head 2 (a bottom face) at a cut portion of the workpiece W. The smaller the dross size is, the better the cutting performance is. In a case where a maximum size of the dross formed along the cutting path is not more than a predetermined criteria value, the cutting performance is evaluated as being good (hereinafter, it is called as good cutting). It depends on the thickness t and the output power M of the laser lights Ls. The criteria values of the dross size in a case where the thickness t is 6-20 mm and the output power M is 6 kW are shown in a line graph in FIG. 3 (the results are offered not by absolute values of the dross size, but by ratio of the dross size to the thickness t). The criteria values are 50 μm (=0.05 mm: criteria ratio 0.0083) for thickness 6 mm, 300 μm (=0.3 mm: criteria ratio 0.025) for thickness 12 mm, and 1200 μm (=1.2mm: criteria ratio 0.06) for thickness 20 mm. Hereinafter, the maximum size of the dross will be also called as a dross height. Since the thickness t of the plate material, the opening diameter D of the nozzle 2b and so on, which are used for the measurements of the criteria values, are taken not continuously but infrequently, the criteria values shown in FIG. 3 form a polygonal line. Its approximate straight line is also shown by a dotted line in FIG. 3 as references for deep understanding.

The measurements are done by fixing <Fixed conditions> shown below. In addition, the workpiece(s) W that is an iron-based plate material is cut experimentally while changing <Parameters> shown below. The cutting performance is evaluated based on the dross height. Further, a maximum cutting speed Vmax that enables to maintain good cutting is also measured.

<Fixed Conditions>
   Output power of laser lights: 6 kW
   Wavelength of laser lights: 1.08 μm
   Core diameter of process fiber: 100 μm
   Opening diameter D of nozzle 2b: 7 mm
   Nozzle height difference Hn: 5.5 mm
   Gap Gp: 0.3 mm
   Beam quality (BPP): ≤4.0 mm*mrad
   Material of workpiece: SUS304
   Type of assist gas: Nitrogen gas
<Parameters>
   Thickness t of workpiece: three type of 6, 12, 20 mm
   Gas pressure Pn of assist gas AG: every 0.2 MPa intervals in a range 0.4 to 1.2 MPa The criteria values (criteria ratios) for good cutting for every thickness t are got as follows as already explained above.

Thickness t=6 mm: Dross height Not more than 50 μm (0.0083)
Thickness t=12 mm: Dross height Not more than 300 μm (0.025)
Thickness t=20 mm: Dross height Not more than 1200 μm (0.06)

The test results of the measurements are, as shown by a bar graph, the ratio of the dross size is 0.0052 for the thickness t=6 mm, the ratio of the dross size is 0.0049 for the thickness t=12 mm, and the ratio of the dross size is 0.049 for the thickness t=20 mm. Every test result takes a value lower than the criteria ratio, and provides good cutting.

Figure 4:
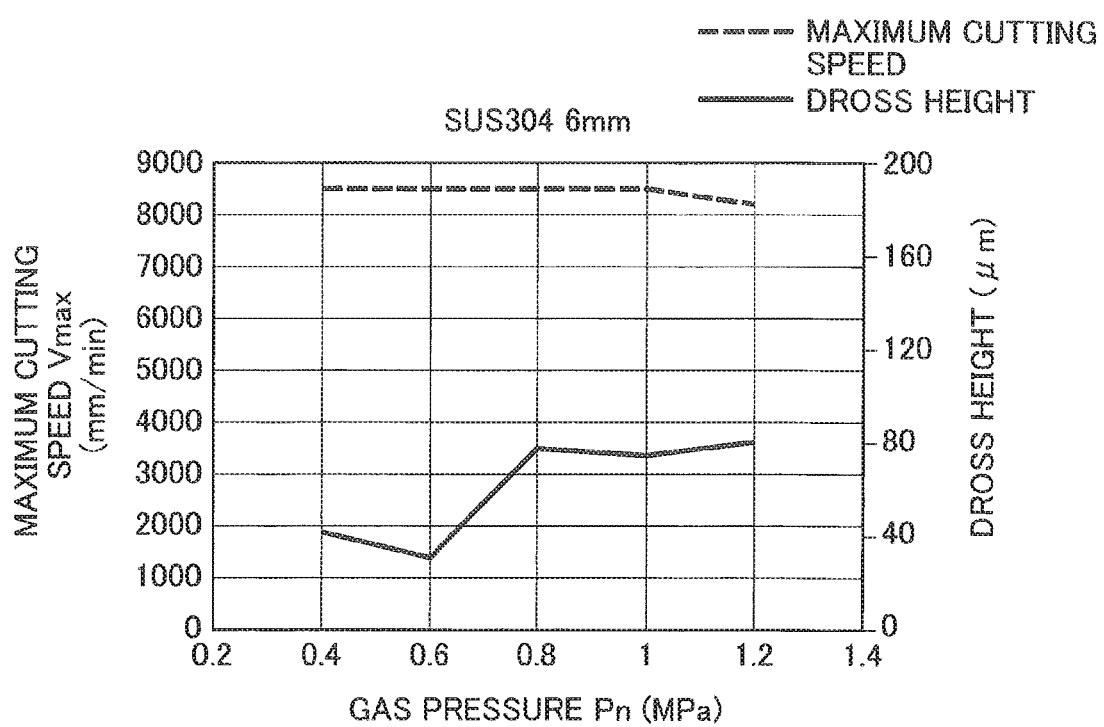
FIG. 4 is a graph showing cutting performance of a thickness 6 mm.
Figure 5:
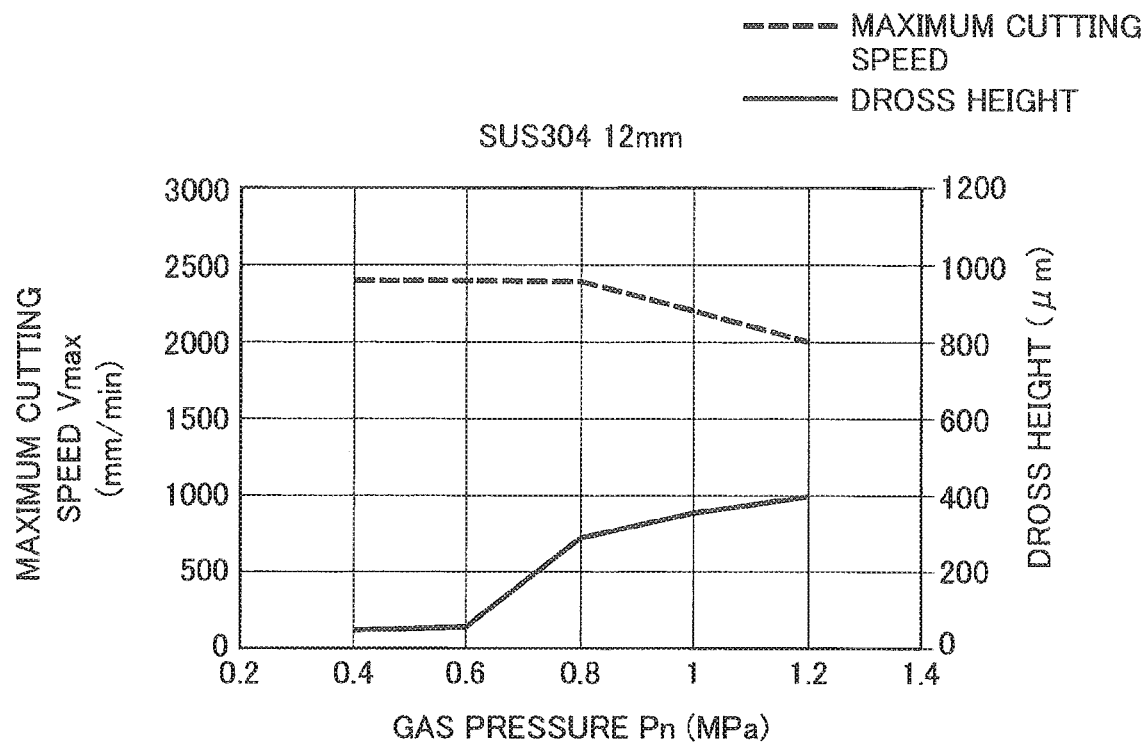
FIG. 5 is a graph showing cutting performance of a thickness 12 mm.
Figure 6:
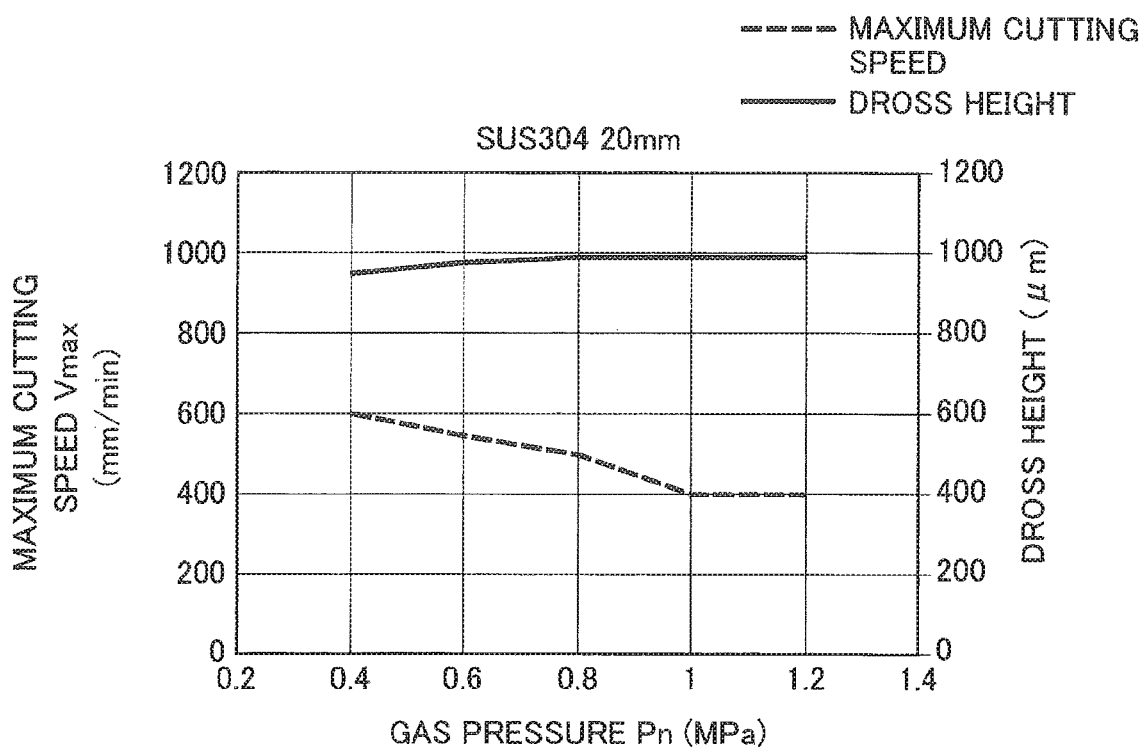
FIG. 6 is a graph showing cutting performance of a thickness 20 mm.

Graphs shown in FIGS. 4 to 6 show the measurement results in cases where SUS304 is used as an iron-based material and the thickness t of the workpiece (s) is 6, 12, 20 mm. Cases of iron-based materials such as mild steel other than SUS304 also provides similar results in general.

(Thickness t=6 mm)
   As shown in FIG. 4, the dross height is not larger than the criteria value (50 μm) in a range of the gas pressure Pn 0.4 to 0.6 MPa, and thereby cutting performances are evaluated as being good. In addition, the maximum cutting speed Vmax takes a value within a range 8000 to 8500 mm/min in an entire range of the gas pressure Pn 0.4 to 1.2 MPa.

(Thickness t=12 mm)
   As shown in FIG. 5, the dross height is not larger than the criteria value (300 μm) in a range of the gas pressure Pn 0.4 to 0.6 MPa, and thereby cutting performances are evaluated as being good. In addition, the dross height is larger than the criteria value (300 μm) in a range of the gas pressure Pn 0.8 to 1.2 MPa, and thereby cutting performances are evaluated as being not-good. Further, the maximum cutting speed Vmax is almost 2800 mm/min in a range of the gas pressure Pn 0.4 to 0.8 MPa, and tends to decrease as the gas pressure Pn rises over 0.8 MPa. The maximum cutting speed Vmax decreases to almost 2000 mm/min when the gas pressure Pn is 1.2 MPa.

(Thickness t=20 mm)

As shown in FIG. 6, the dross height is not larger than the criteria value (1200 μm) in an entire range of the gas pressure Pn 0.4 to 1.2 MPa, and thereby cutting performances are evaluated as being good. In addition, the maximum cutting speed Vmax takes a value 400 to 600 mm/min in an entire range of the gas pressure Pn 0.4 to 1.2 MPa.

According to the above results, it becomes obvious that, in a case of the opening diameter D is 7 mm, a thick plate material made of SUS304 whose thickness t is 6 to 20 mm can get good cutting at least in a range of the gas pressure Pn 0.4 to 0.6 MPa. In addition, the maximum cutting speed Vmax gets larger as the gas pressure Pn gets smaller in a range of the gas pressure Pn 0.4 to 1.2 MPa.

(Opening Diameter D)

Figure 7:
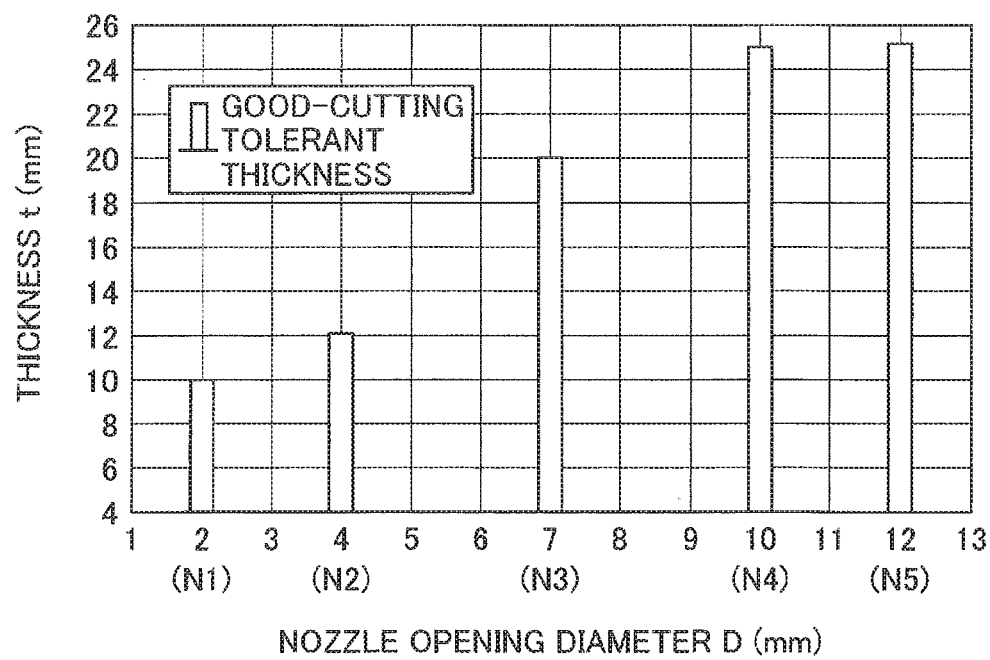
FIG. 7 is a graph showing relation between an opening diameter D of the nozzle 2b and a good-cutting tolerant thickness.

The opening diameter D of the nozzle 2*b* is further used as a parameter under the above measurement conditions to evaluate cutting performances in cases where the opening diameter D is 2.0, 4.0, 7.0, 10.0 and 12.0 mm. The measurements are done to find out the SUS304 thickness t that enables good cutting within a range 0.4 to 0.6 MPa of the gas pressure Pn. FIG. 7 is a graph showing the evaluation results.

Note that the nozzle number(s) N1 to N5 is allocated to the nozzle 2*b* whose opening diameter D is 2.0, 4.0, 7.0, 10.0 and 12.0 mm, respectively, as shown in a Table 2 shown below.

TABLE 1

| Nozzle No. | N1 | N2 | N3 | N4 | N5 |
|---|---|---|---|---|---|
| Opening diameter D (mm) | 2.0 | 4.0 | 7.0 | 10.0 | 12.0 |

As shown in FIG. 7, if the opening diameter D is large, good cutting can be done even for a thick plate. Namely, a maximum thickness capable of getting good cutting depends on the opening diameter D of the nozzle 2*b*. In addition, a cutting tolerant thickness saturates when the opening diameter D is 10 mm or larger.

For example, in a case of laser-cutting a plate material having a thickness t=10 mm under the above fixed conditions (other than the opening diameter D), all the nozzles 2*b* of the nozzle Nos. N1 to N5 are selectable according to the FIG. 7. In addition, in a case of laser-cutting a plate material having a thickness t=20 mm, the nozzles 2*b* of the nozzle Nos. N3 to N5 are selectable according to the FIG. 7.

(Output Power M of Laser Lights Ls)

Figure 8:
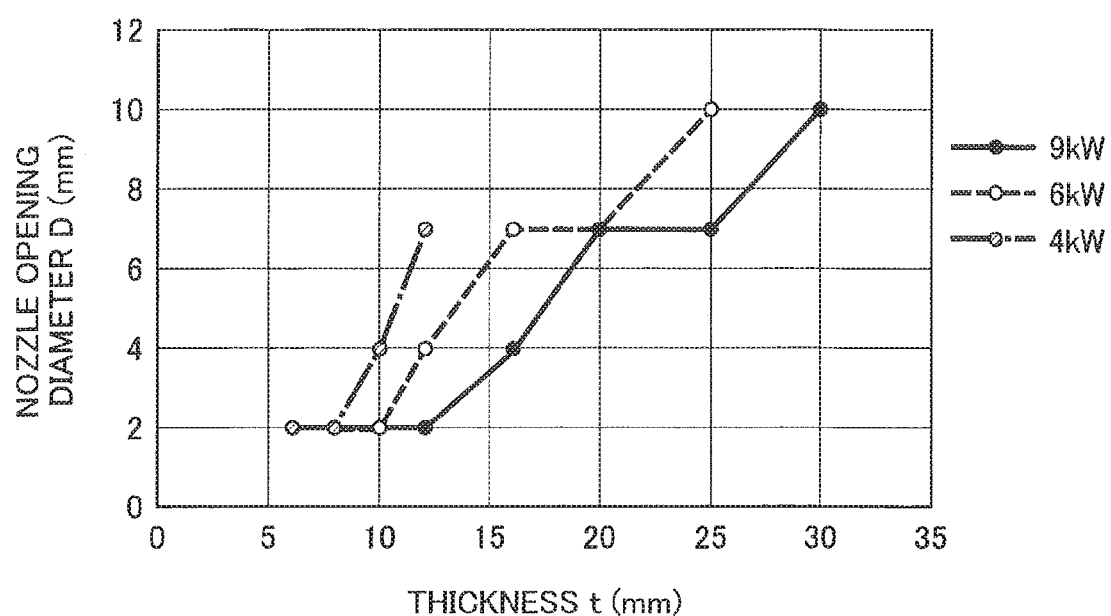
FIG. 8 is a graph showing relation between a thickness t and the opening diameter D with respect to each laser output power.

Next, the output power M of the laser lights Ls in the above fixed conditions is used as a parameter to evaluate similarly whether or not the selectable nozzle(s) 2*b* depends on the output power M of the laser lights Ls. Specifically, relations between the thickness t and the opening diameter D that enables good cutting are measured fox each output power M of 4 kW and 9 kW in addition to the above 6 kW. Note that, if plural opening diameters D that enable good cutting exist for each thickness t, the opening diameter D whose maximum cutting speed Vmax is fastest is selected. It is because a consumption volume of the assist gas AG gets smaller due to short processing time as the maximum cutting speed Vmax gets faster. FIG. 8 is a graph showing the measurement results.

As shown in FIG. 8, the larger the output power M gets, the thicker workpiece can get good cutting. In addition, not depending on the output power M, the larger the thickness t gets, the larger opening diameter D is required for good cutting.

(Opening Diameter D and Output Power M)

Namely, in actual laser-cutting, good cutting can be done in response to changes of the thickness t of the workpiece W by changing one or both of the output power M of the laser lights Ls and the opening diameter D of the nozzle 2*b* based on comparison of a second thickness of a workpiece W (second plate material) to be cut in a following second cutting with a first thickness of a workpiece W (first plate material) that is cut in a first cutting. The cases of changing one or both of the output power M and the opening diameter D will be explained hereinafter.

<Case of Changing only Opening Diameter D>

In a case of cutting workpieces W having different thicknesses t without changing the output power M of the laser lights Ls, the nozzles 2*b* having different opening diameters D are selected in association with the thicknesses t. If a thickness t of a workpiece W to be cut is larger than a thickness t of a workpiece W that is cut in a preceding processing, selected is a nozzle 2*b* having a larger opening diameter D than an opening diameter D in the preceding processing. On the other hand, if a thickness t of a workpiece W to be cut is smaller than a thickness t of a workpiece W that is cut in a preceding processing, selected is a nozzle 2*b* having a smaller opening diameter D than an opening diameter D in the preceding processing. Then, laser-cutting is done by the selected nozzle 2*b*. For example, according to FIG. 8, for cutting a workpiece W whose thickness t is 16 mm when the thickness t in a preceding processing is 10 mm, the output power M=6 kW is not changed and the opening diameter D is changed from 2 mm to 7 mm.

<Case of Changing only Output Power M of Laser Lights Ls>

In a case of cutting workpieces W having different thicknesses t without changing the nozzle 2*b*, the output power M of the laser lights Ls is changed to a different value in association with the thicknesses t. If a thickness t of a workpiece W to be cut is larger than from a thickness t of a workpiece W that is cut in a preceding processing, a larger output power M is set than an output power M in the preceding processing. On the other hand, if a thickness t of a workpiece W to be cut is smaller than a thickness t of a workpiece W that is cut in a preceding processing, a smaller output power M is set than an output power M in the preceding processing. For example, according to FIG. 8, for cutting a workpiece W whose thickness t is 16 mm when the thickness t in a preceding processing is 10 mm, the nozzle 2*b* having the opening diameter D=4 mm is not changed and the output power M is changed from 4 kW to 9 kW.

<Case of Changing both of Opening Diameter of Nozzle 2*b* and Output Power M of Laser Lights Ls>

In a case of cutting a workpiece W having a thickness t identical to a thickness t that have got good cutting in a preceding processing, good cutting can be maintained by setting one of the opening diameter D and the output power M larger and setting the other of them smaller. For example, according to FIG. 8, in a case of the thickness t is 12 mm, when an opening diameter D is 2 mm and an output power M is 9 kW in a preceding processing, the opening diameter D is made large to 7 mm and the output power M is made smaller to 4 kW.

It can be determined appropriately whether to change the opening diameter D or the output power M according to various conditions such as a thickness t of a workpiece W to be processed in future, electric power consumption of the laser oscillator 6 and a condition of the nozzle 2b (maintenance timing). Since good cutting can be maintained by selection of these two parameters (the opening diameter D and the output power M), reduction of production efficiency can be restricted. For example, against a failure where a nozzle 2b having a certain opening diameter D is damaged, possibility for maintaining good cutting can be made large by adjusting the output power M of the laser oscillator 6. In addition, against a failure where a large output power M cannot be set due to malfunction of the laser oscillator 6, possibility for maintaining good cutting can be made large by exchanging the nozzle 2b with that having a different opening diameter D.

As explained above, the nozzle 2b selectable for good cutting of a workpiece W that is a thick plate material can be determined according to the output power M of the laser lights Ls. The reason why good cutting of a thick workpiece W can be achieved as the output power M gets larger is assumed as follows. Since power density of the laser lights Ls gets higher as the output power M gets larger, viscosity of melted metal in a kerf decreases. If the gas pressure Pn of the assist gas AG is constant, a heat amount for cooling the melted metal in the kerf is constant. Therefore, the viscosity of melted metal decreases by an increase of the output power M, and then the melted metal is promoted to be ejected out from the kerf. As the result, in a case of a constant opening diameter D, good cutting of a thicker workpiece W can be done.

In addition, the reason why good cutting of a thick workpiece W can be achieved as the output power M gets larger is also assumed as follows in consideration of a plasma state in a kerf. Namely, if the gas pressure Pn of the assist gas AG is constant, the plasma state in the kerf is constant. Therefore, energy not affected by the plasma state in energy of the laser lights Ls increases as the output power M gets larger. Melting of inner side faces within the kerf is promoted by this energy increase. As the result, good cutting of a thicker workpiece W can be achieved in a case of a constant opening diameter D.

According to the results of the above measurements (evaluations), relation between a thickness t of a workpiece W and a nozzle number that should be selected for good cutting of the thickness t of the workpiece W can be specified. Therefore, nozzle numbers that enable good cutting with a minimum consumption volume of the assist gas AG are defined as a table with respect to each combination of the output power M and the thickness t. As explained above, the Table 1 shows one example of the nozzle selection table Tn. Note that, as explained above, the relation between the nozzle number and the opening diameter D is shown in the above Table 2.

According to the nozzle selection table Tn shown in the Table 1, the nozzle number that should be selected for each combination of the thickness t and the output power M can be specified. For example, in a case where the thickness t is 10.0 mm and the output power M is 9 kW, good cutting can be done with a minimum consumption volume of the assist gas AG by the N1 nozzle 2b. In a case where the thickness t is 20.0 mm, no nozzle 2b can be selected when the output power is 4 kW, but good cutting can be done with a minimum consumption volume of the assist gas AG with the 6 kW or 9 kW output power M by the N3 nozzle 2b.

Figure 9:
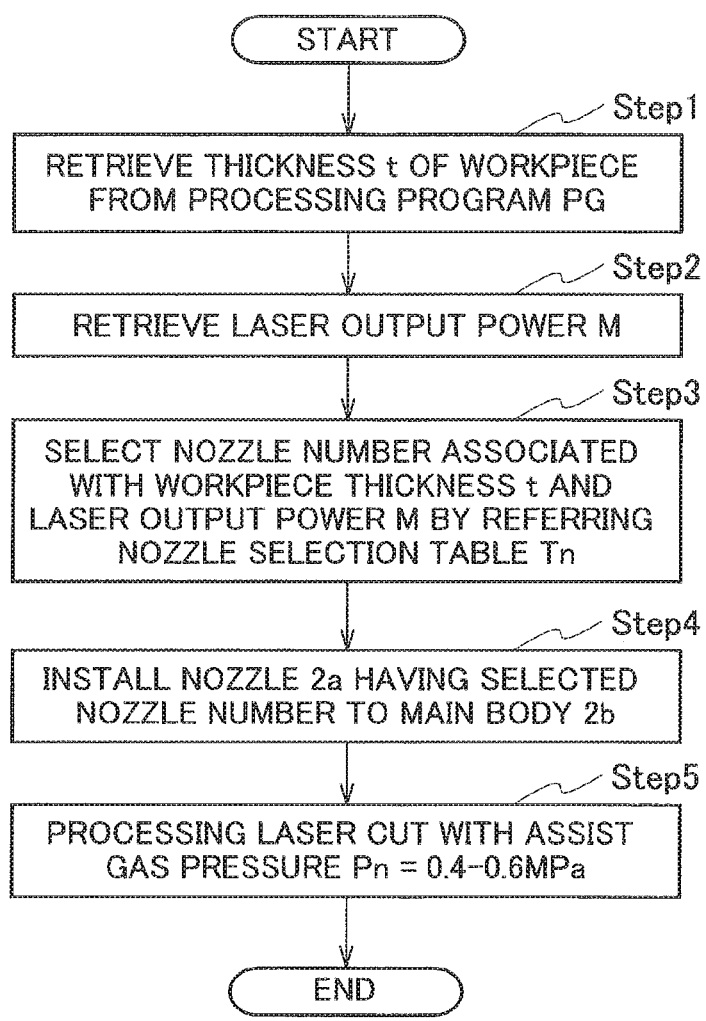
FIG. 9 is a flowchart of nozzle selection processes.

The nozzle selection table Tn is input from outside to the controller 5, and then stored in the memory storage 12. By use of the stored nozzle selection table Tn, the laser processing apparatus 51 executes laser-cutting by selecting the nozzle 2b as shown in a flowchart shown in FIG. 9.

The nozzle selector 14 of the controller 5 retrieves a thickness t of a workpiece W to be cut next from the processing program PG stored in the memory storage 12 (Step 1), and then retrieves an output power M of laser lights Ls to be irradiated in the laser cutting (Step 2). Subsequently, the nozzle selector 14 confirms a nozzle number that is associated with the thickness t and the output power M retrieved in the Step 1 with referring to the nozzle selection table Tn (Step 3). For example, when the thickness t is 12.0 mm and the output power M is 6 kW, the N2 nozzle 2b is selected with referring to the nozzle selection table Tn shown in the above Table 1.

The nozzle selector 14 gives, to the nozzle changer 8, a command for installing the N2 nozzle 2b to the main body 2a, and the nozzle changer 8 installs the N2 nozzle 2b to the main body 2a (Step 4). The laser oscillator 6 supplies the laser lights Ls to the processing head 2 by the output power M=6 kW based on a command from the CPU 11. In addition, the assist-gas supply device 7 keeps the gas pressure Pn of the assist gas AG within a range 0.4 to 0.6 MPa. Further, the drive unit 3 moves the processing head 2 relatively to the workpiece W to laser-cut the workpiece W so that the laser lights Ls is irradiated along a path specified by the processing program PG (Step 5).

Figure 10:
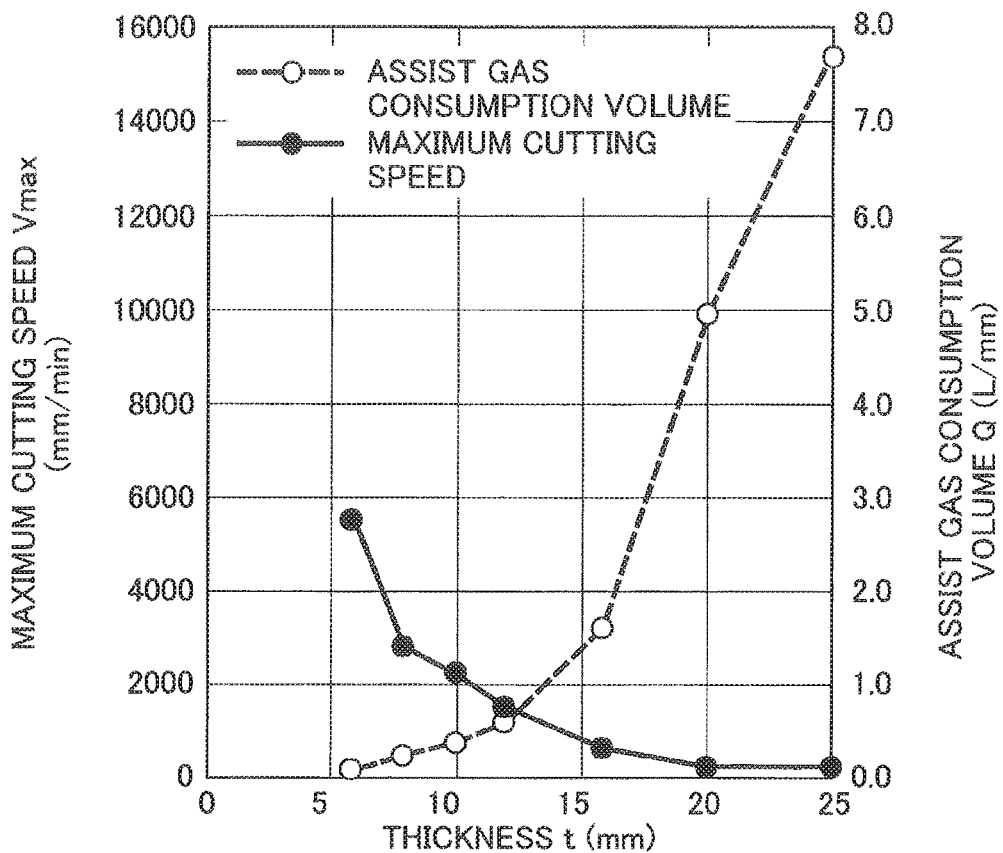
FIG. 10 is a graph showing a consumption volume Q of assist gas Ag with respect to $CO_2$ lasers.
Figure 11:
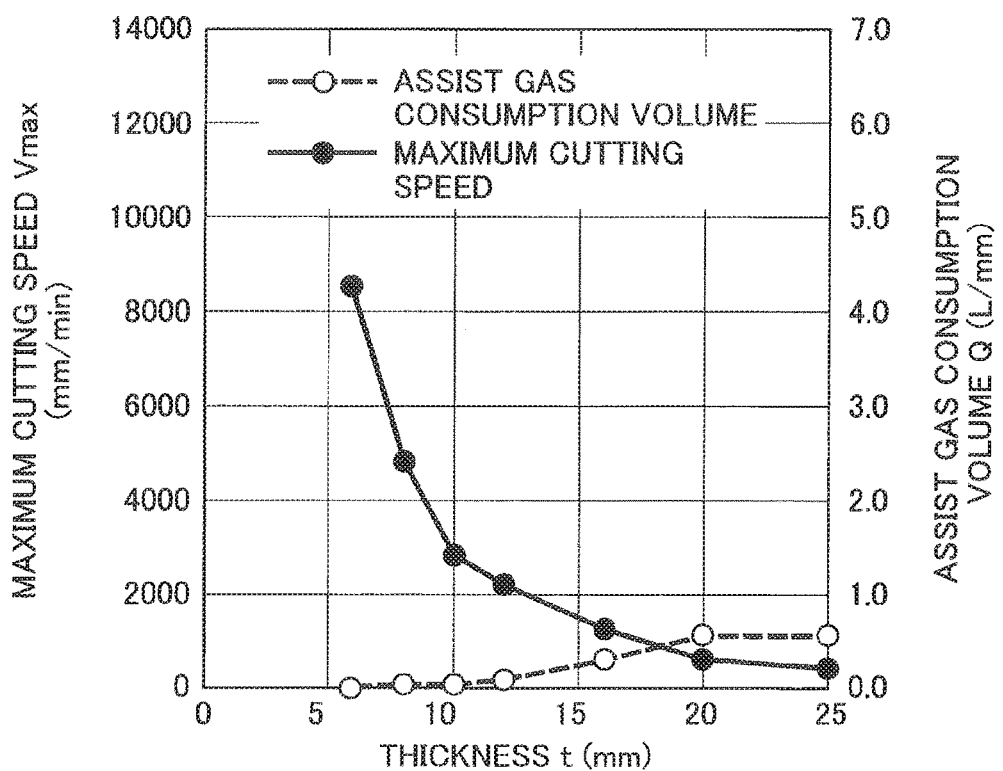
FIG. 11 is a graph showing a consumption volume Q of assist gas Ag according to the embodiment 1.

FIG. 10 and FIG. 11 are graphs each shows relation between the thickness t (horizontal axis) and a consumption volume of the assist gas (right vertical axis). Each of the graphs also shows relation between the thickness t (horizontal axis) and a maximum cutting speed (left vertical axis). FIG. 10 shows the consumption volume of the assist gas with conventional $CO_2$ laser. FIG. 11 shows the consumption volume of the assist gas AG with the processing method in which the laser oscillator 6 that oscillates fiber laser lights and the nozzle 2b selected based on the nozzle selection table Tn are used.

According to the above-mentioned laser processing method, with respect to a SUS304 plate material whose thickness t is not smaller than 6 mm, high-speed good cutting can be done with less assist gas AG of a relatively low gas pressure Pn, 0.4 to 0.6 MPa, by using the nozzle 2b having the opening diameter D associated with the thickness t. Then, the appropriate nozzle 2b can be selected with ease by preliminarily preparing the nozzle selection table Tn that makes it possible to specify the opening diameter D that enables good cutting with less assist gas AG according to the thickness t and by referring to the nozzle selection table Tn. By the laser processing apparatus 51 and the laser processing method according to the present embodiment, it is possible to laser-cut the workpiece W that is a thick plate material with a smaller consumption volume of the assist gas AG and at low costs as shown in FIG. 11.

(Gap Gp)

In the above-explained method, the gap GP=0.3 mm is included in the fixed conditions. The inventors make further measurements in which the gap Gp is used as a parameter, and then know that a dross height and an assist gas consumption volume Q depend on the gap Gp. This knowledge will be explained hereinafter with reference to FIG. 12 to FIG. 14.

Figure 12:
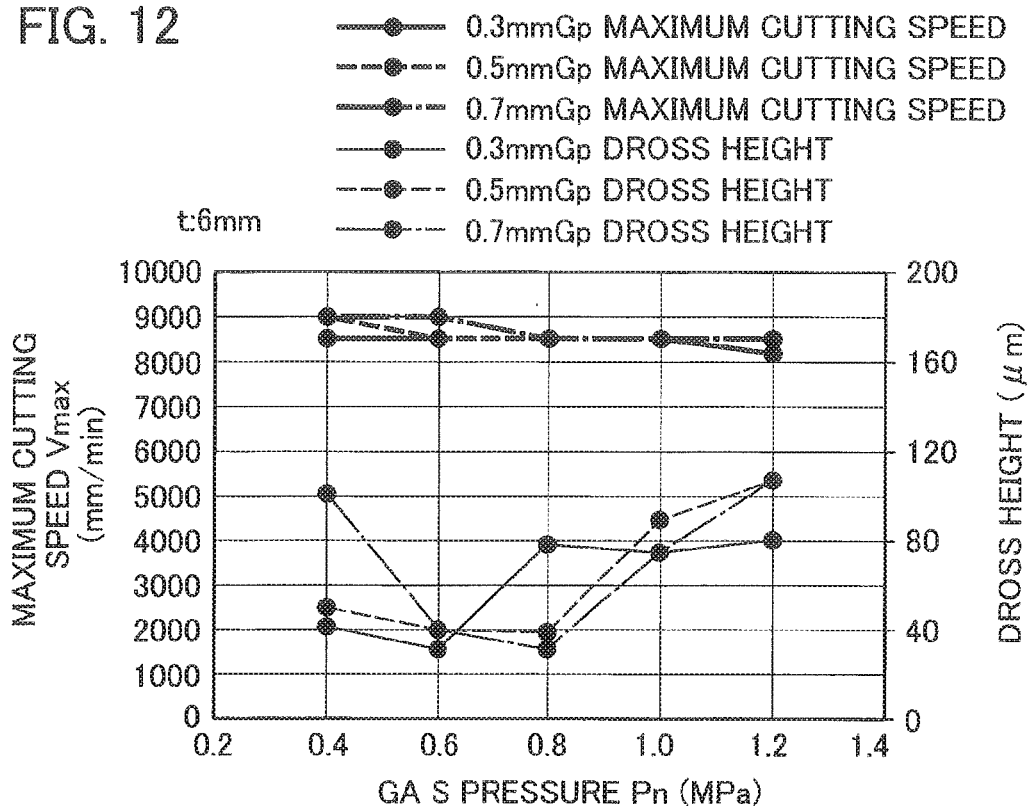
FIG. 12 is a graph showing relation between a gas pressure Pn and a dross height and relation between the gas pressure Pn and a maximum cutting speed Vmax with respect to each gap Gp (thickness t=6 mm).
Figure 13:
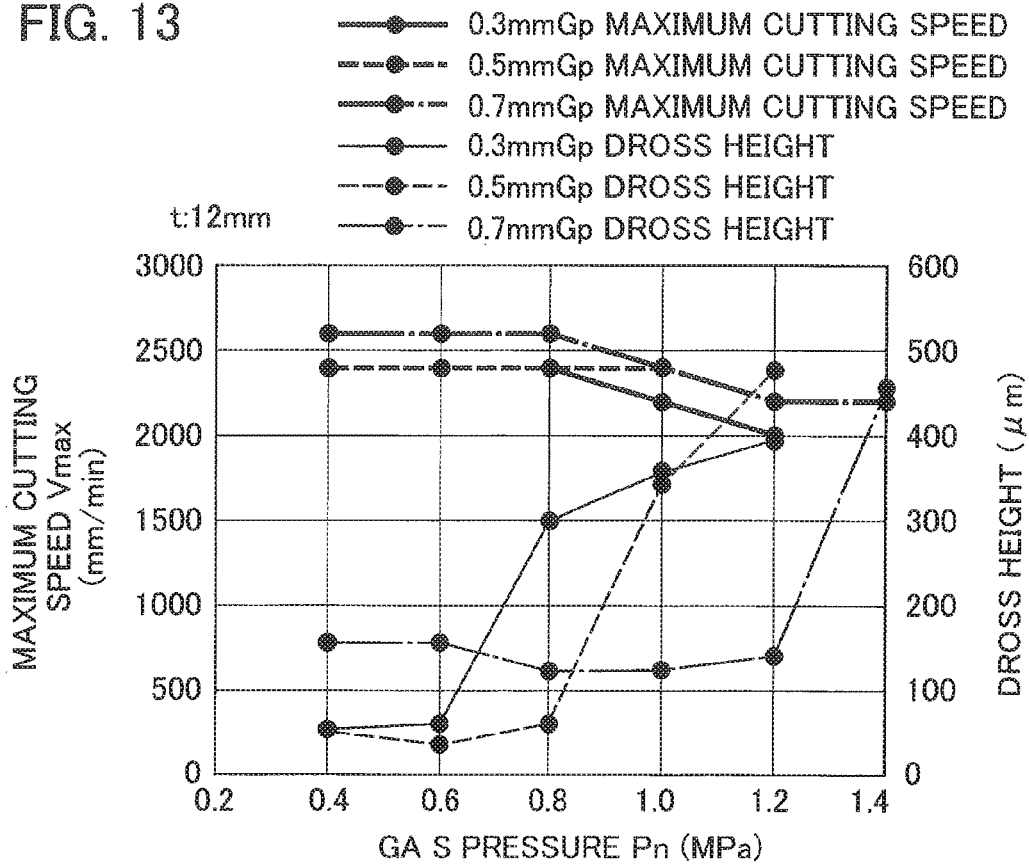
FIG. 13 is a graph showing relation between a gas pressure Pn and a dross height and relation between the gas pressure Pn and a maximum cutting speed Vmax with respect to each gap Gp (thickness t=1.2 mm).
Figure 14:
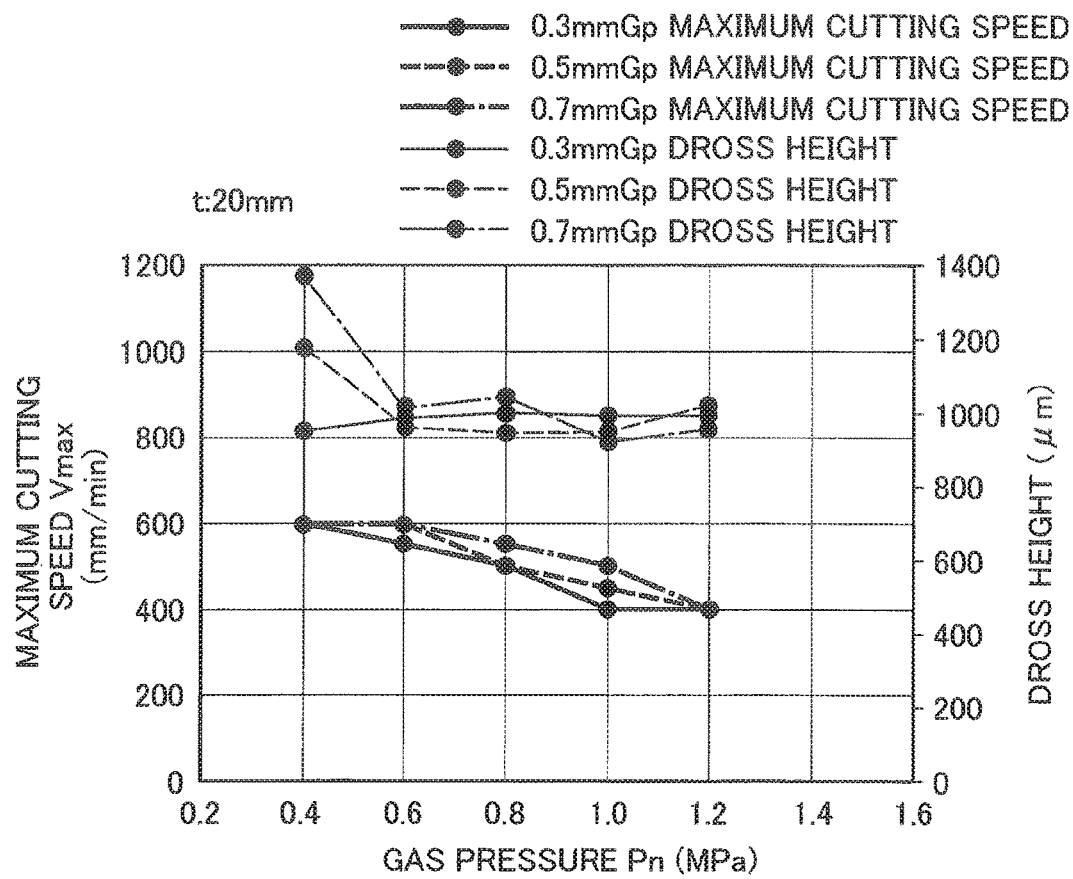
FIG. 14 is a graph showing relation between a gas pressure Pn and a dross height and relation between the gas pressure Pn and a maximum cutting speed Vmax with respect to each gap Gp (thickness t=20 mm).

FIG. 12 to FIG. 14 show relation between a gas pressure Pn (horizontal axis) and a maximum cutting speed (left vertical axis) and relation between a gas pressure Pn and a dross height (right vertical axis) in cases of the gap Gp=0.3 mm, 0.5 mm and 0.7 mm. FIG. 12 shows a case of laser-cutting a SUS304 material with a thickness t=6 mm, FIG. 13 shows a case with thickness t=12 mm and FIG. 14 shows a case with a thickness t=20 mm.

The case with the thickness t=6 mm will be explained. As shown in FIG. 12, in a case of the gas pressure Pn=0.4 MPa, a dross height is larger with the gap Gp=0.7 mm and failure of good cutting degrades cutting performance. In a case of the gas pressure Pn=0.6 MPa, no difference due to gap Gp is found in cutting performance and good cutting can be done. In a case of the gas pressure Pn=0.8 MPa, a dross height is larger with the gap Gp=0.3 mm and failure of good cutting degrades cutting performance. When the gas pressure Pn is not smaller than 1.0 MPa, failure of good cutting degrades cutting performance with all the gaps Gp. The maximum cutting speed Vmax is good at 8500 to 9000 mm/min with the gas pressure Pn=0.4 to 1.2 MPa without depending on the gap Gp.

The case with the thickness t=12 mm will be explained. As shown in FIG. 13, in cases of the gas pressure Pn=0.4 to 0.6 MPa, a dross height is larger with the gap Gp=0.7 mm and failure of good cutting degrades cutting performance. On the other hand, when the gas pressure Pn is not smaller than 0.8 MPa, a dross height is smaller with the gap Gp=0.7 mm. Namely, with respect to the gap Gp=0.7 mm, a dross height with the gas pressure Pn=0.8 MPa is smaller than a dross height with the gap Gp=0.3 mm and good cutting can be done. In addition, with respect to the gap Gp=0.7 mm, a dross height with the gas pressure Pn not smaller than 1.0 MPa is smaller than a dross height with the gap Gp=0.3 or 0.5 mm and good cutting can be done. Differences due to the gap Gp in the maximum cutting speed Vmax is not large, but the maximum cutting speed Vmax with the gap Gp=0.7 mm is larger, while keeping the best value, than the maximum cutting speed Vmax with the gap Gp=0.3 and 0.5 mm without depending on the gas pressure Pn.

The case with the thickness t=20 mm will be explained. As shown in FIG. 14, in a case of the gas pressure Pn=0.4 MPa, a dross height is larger with the gap Gp=0.5 and 0.7 mm (especially large with Gp=0.7 mm) and failure of good cutting degrades cutting performance. When the gas pressure Pn is not smaller than 0.6 MPa, no obvious difference due to the gap Gp is found, and good cutting can be done. No obvious difference is found in the maximum cutting speed Vmax with the gas pressure Pn=0.4 to 1.2 MPa, but the maximum cutting speed Vmax gets smaller as the gas pressure Pn gets larger.

According to the graphs shown in FIG. 12 to FIG. 14, it is known that the maximum value of the gas pressure Pn that enables good cutting gets larger as the gap Gp gets larger. In addition, with the gas pressure Pn=0.4 to 0.8 MPa, even with respect to the thickness t that cannot get good cutting, there may be a case where it can get good cutting by setting the gap Gp (e.g. one step) larger. It is also known that, even if a fine adjustment for making the cutting speed smaller and making the gas pressure Pn larger is needed in a case where the gap Gp is made larger as mentioned above, laser-cutting can be done with a good cutting speed similar to a cutting speed with the gas pressure Pn not larger than 0.6 MPa (the smaller the gas pressure Pn is, the larger the maximum cutting speed Vmax is). Therefore, when the gap Gp is made large, it can be expected that the assist gas consumption volume G is made smaller than that in a case of the gas pressure Pn more than 1 MPa.

Specific explanations will be made in accord with the example explained with reference to FIG. 4 to FIG. 6 (example in which good cutting can be done by making the gas pressure Pn smaller). Although the gas pressure Pn is made smaller (e.g. Pn=0.4 to 0.6 MPa) in order to make the assist gas consumption volume Q smaller, the gap Gp is made larger (e.g. Gp=0.3 mm is changed to 0.5 mm) and the gas pressure Pn is made larger (changed to Pn=0.8 MPa) in a case of a specific thickness t (e.g. t=12 mm) that hardly gets good cutting.

Figure 15:
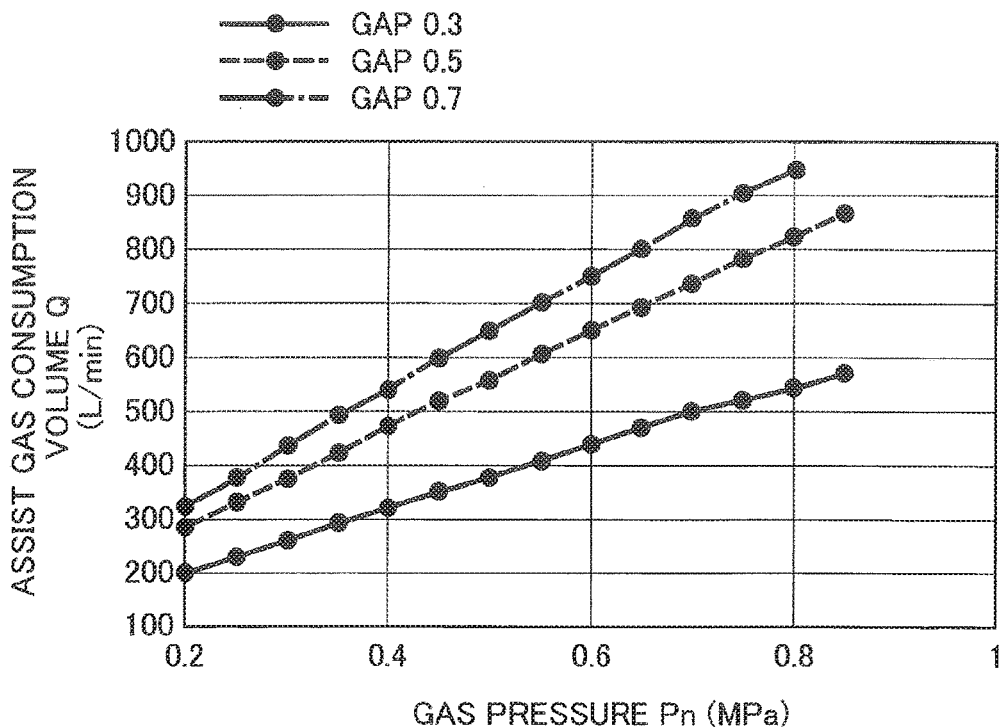
FIG. 15 is a graph showing relation between a gas pressure Pn and a consumption volume Q of assist gas Ag with respect to each gap Gp.

FIG. 15 is a graph showing relation between the gas pressure Pn and the assist gas consumption volume Q with the gap Gp=0.3 mm, 0.5 mm and 0.7 mm. The opening diameter D of the nozzle 2b is 7 mm. A shown in FIG. 15, the assist gas consumption Q increases as the gas pressure Pn gets large. The assist gas consumption Q increases as the gap Gp gets large without depending on the gas pressure Pn. It is assumed that the assist gas AG injected from the nozzle 2b may receive large resistance from the workpiece W when the gap Gp is small and that, even if the gas pressure Pn in the main body 2a is equal thereto, an injected volume of the assist gas AG may be restricted and thereby the consumption volume Q is restricted. Namely, it is preferable that the gap Gp is small in view of the assist gas consumption volume Q.

Therefore, high-speed good cutting can be done with the gap Gp=0.7 mm by setting the gas pressure Pn=0.4 to 0.6 MPa or larger (tendency shown in FIG. 12 to FIG. 14), but the assist gas consumption volume Q gets more than that in cases of the smaller gap Gp=0.3 mm and 0.5 mm. Thus, as a method for setting the gap Gp in view of the deduction (optimization) of the assist gas consumption Q, a method explained next is effective. Namely, the tracking control unit 13 generally controls the drive unit 3 by setting the gap Gp small, about 0.3 to 0.5 mm, (to reduce the assist gas consumption volume Q). But, in a case of cutting a portion of the workpiece W where a local undulation on its surface Wa is prominent, it controls the drive unit 3 so as to make the gap Gp large temporarily in order to avoid contacts between the workpiece W and the nozzle 2b during the tracking motion.

(Nozzle Height Difference Hn)

The inventors also make measurements in which the nozzle height difference Hn (distance between the tip end 2bb1 of the inner nozzle 2bb and the tip end 2b1 of the outer nozzle 2ba in the direction of the axial line CL2) is used as a parameter. As the result, relation between the nozzle height difference Hn and the dross height and relation between the nozzle height difference Hn and a "good-cutting tolerant focal range" become apparent, and thereby they will be explained with reference to FIG. 16 to FIG. 20. Mote that the "good-cutting tolerant focal range" is a focal range of the laser lights Ls enabling good cutting, i.e. a tolerance range of a focal position for good cutting.

Figure 16:
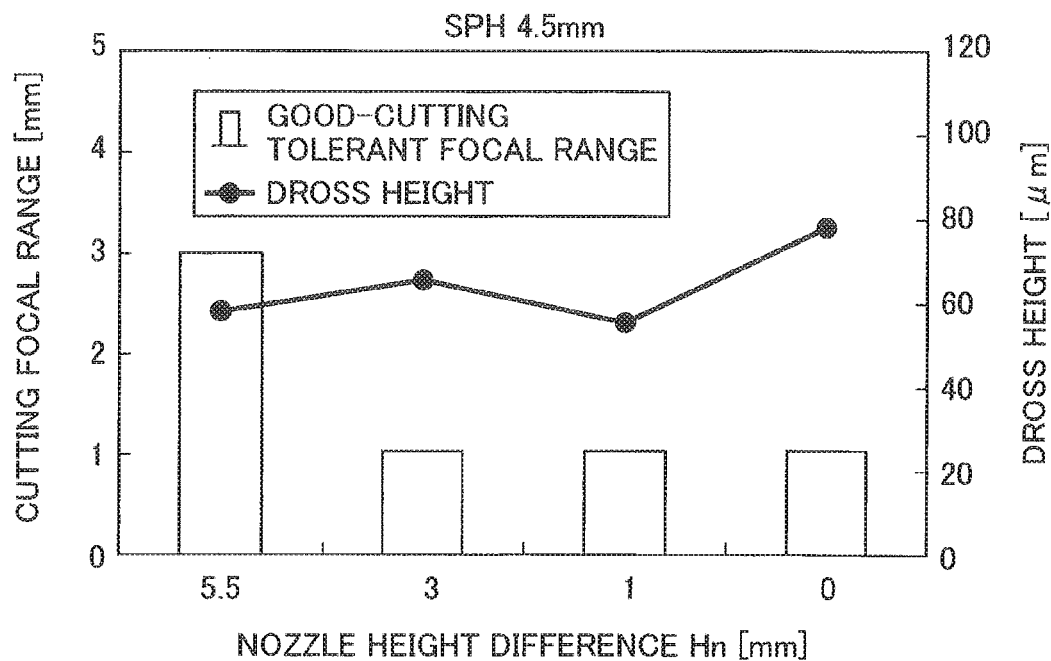
FIG. 16 is a graph showing relation between a nozzle height difference Hn and a good-cutting tolerant focal range and relation between the nozzle height difference Hn and a dross height with respect to SPH (t=4.5 mm).
Figure 17:
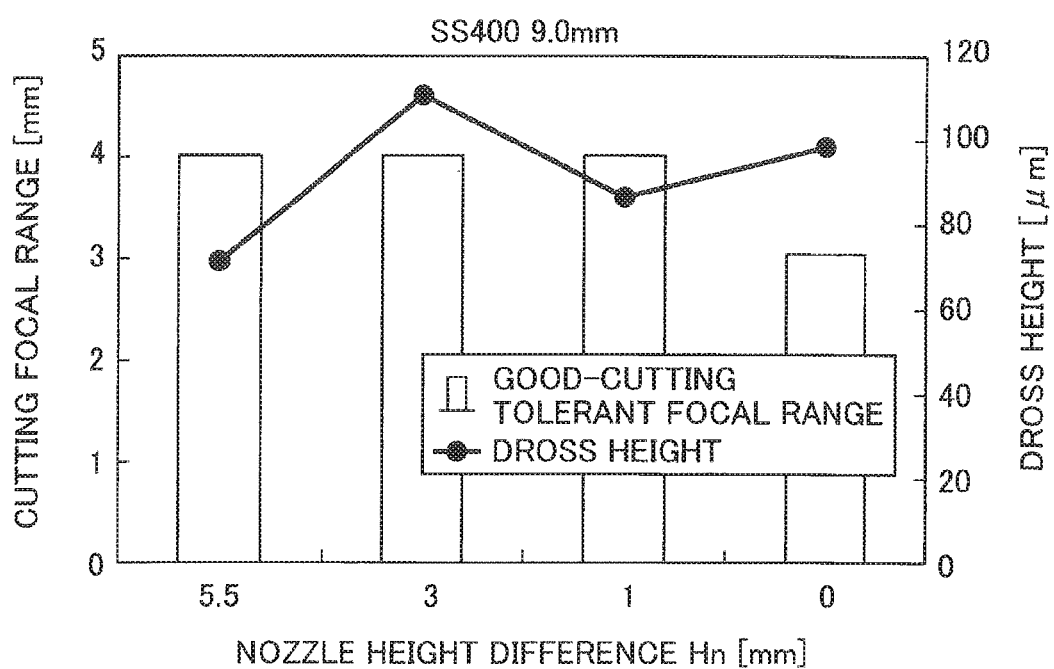
FIG. 17 is a graph showing relation between a nozzle height difference Hn and a good-cutting tolerant focal range and relation between the nozzle height difference Hn and a dross height with respect to SS400 (t=9.0 mm).
Figure 18:
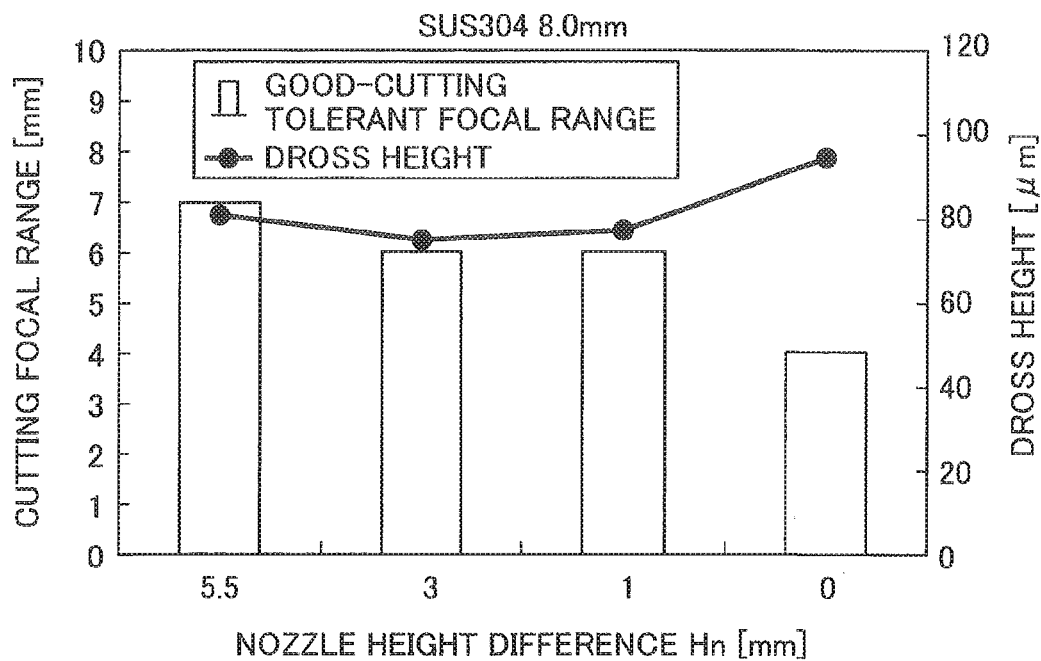
FIG. 18 is a graph showing relation between a nozzle height difference Hn and a good-cutting tolerant focal range and relation between the nozzle height difference Mn and a dross height with respect to SUS304 (t=8.0 mm).
Figure 19:
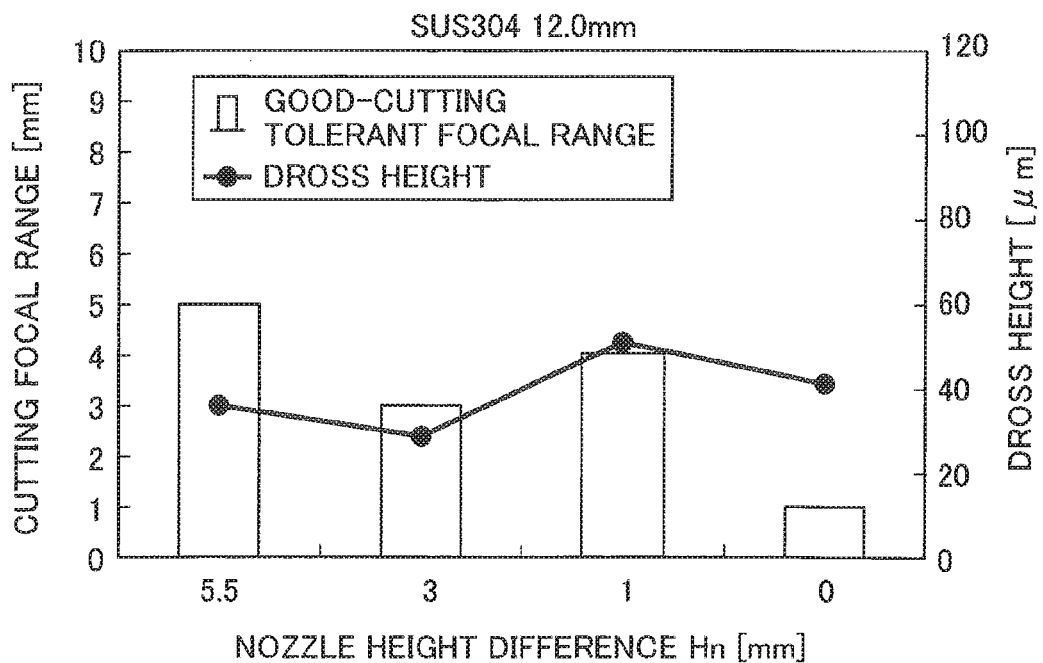
FIG. 19 is a graph showing relation between a nozzle height difference Hn and a good-cutting tolerant focal range and relation between the nozzle height difference Hn and a dross height with respect to SUS304 (t=12.0 mm).
Figure 20:
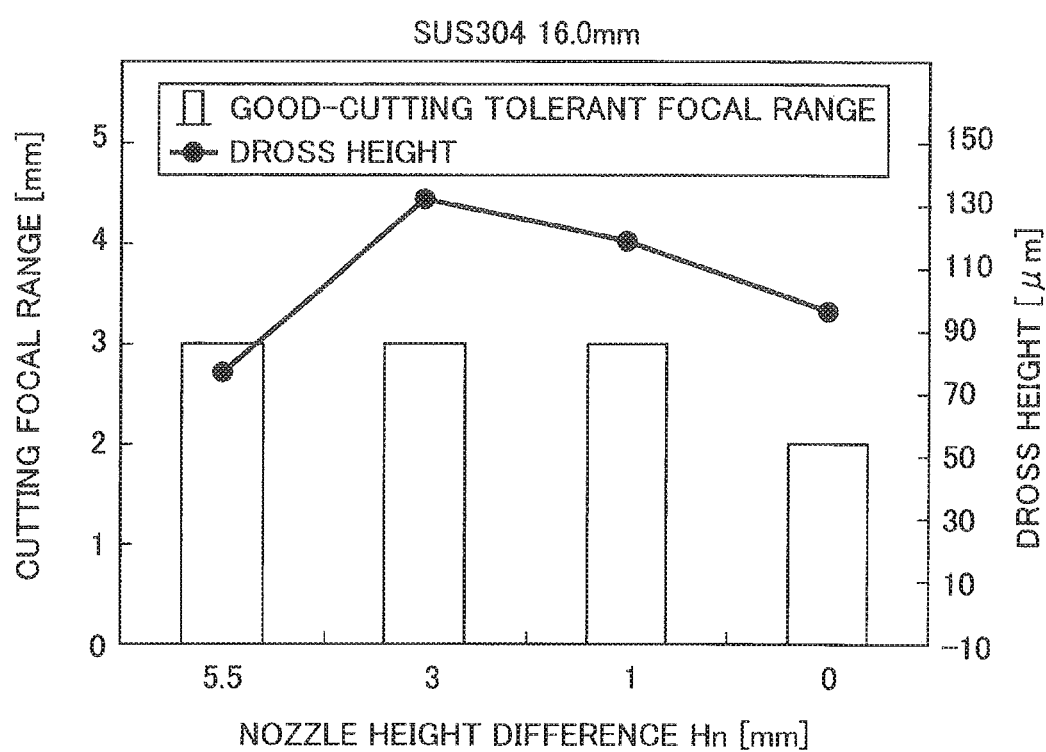
FIG. 20 is a graph showing relation between a nozzle height difference Hn and a good-cutting tolerant focal range and relation between the nozzle height difference Hn and a dross height with respect to SUS304 (t=16.0 mm).

FIG. 16 to FIG. 20 show measurement results with respect to five types of the workpieces W that are made of different materials and have different thicknesses t. For descriptive purposes, the good-cutting tolerant focal range (left vertical axis) is shown by a bar graph, and the dross height (right vertical axis) is shown by a line graph. FIG. 16 shows the measurement result of a hot-rolled sheet steel plate (SPH) having a thickness t=4.5 mm, and FIG. 17 shows that of a rolled steel plate for general structure (SS400) having a thickness t=9.0 mm. In addition. FIG. 18 shows the measurement result of a stainless steel (SUS304) having a thickness t=8.0 mm, FIG. 19 shows that of SUS304 having a thickness t=12.0 mm, and FIG. 20 shows that of SUS304 having a thickness t=16.0 mm. The measurements are done with the nozzle height difference Hn=0 mm, 1 mm, 3 mm and 5.5 mm. The larger the good-cutting tolerant focal range gets, the larger a margin for a focal adjustment gets. Therefore, a larger good-cutting tolerant focal range is preferable in view of workability of processing operations.

As shown in FIG. 16 (SPH: t=4.5 mm), the good-cutting tolerant focal range with the nozzle height difference Hn=5.5 mm is larger than that with Hn=3 mm or smaller (good with Hn=5.5 mm). On the other hand, the dross height with the nozzle height difference Hn=0 is larger than that with Hn=1 mm or larger (good with Hn=1 mm or larger).

A following advantage can be brought as the good-cutting tolerant focal range gets larger. There may be a certain difference(s) between a processing environment(s), as a base for processing conditions, which are supplied to a processing workplace by a manufacturer of a laser processing apparatus, and a processing environment(s), including ordered materials, existing machines and so on, at an actual processing workplace. Here, it is supposed that a focal position of actual laser lights at the workplace may deviate slightly from a focal point of laser lights commended by the manufacturer. Also in such a case, if the good-cutting tolerant focal range (a range of a focal position that enables good cutting of a workpiece W) is large, the workpiece W can get good cutting without adjusting other conditions.

As shown in FIG. 17 (SS: t=9.0 mm), the good-cutting tolerant focal range with the nozzle height difference Hn=0 is smaller than that with Hn=1 mm or larger (good with Hn=1 mm or larger). On the other hand, the dross height with the nozzle height difference Hn=5.5 mm is smaller than that with Hn=3 mm or smaller (good with Hn=5.5 mm).

As shown in FIG. 18 (SUS: t=8.0 mm), the good-cutting tolerant focal range with the nozzle height difference Hn=0 is smaller than that with Hn=1 mm or larger (good with Hn=1 mm or larger). On the other hand, the dross height with the nozzle height difference Hn=1 mm or larger is smaller than that with Hn=0 (good with Hn=1 mm or larger).

As shown in FIG. 19 (SUS: t=12.0 mm), the good-cutting tolerant focal range with the nozzle height difference Hn=0 is smaller than that with Hn=1 mm or larger (good with Hn=1 mm or larger). On the other hand, with respect to the dross height, no obvious difference is found due to the nozzle height difference Hn.

As shown in FIG. 20 (SUS: t=16.0 mm), the good-cutting tolerant focal range with the nozzle height difference Hn=0 is smaller than that with Hn=1 mm or larger (good with Hn=1 mm or larger). On the other hand, the dross height with the nozzle height difference Hn=5.5 mm is smaller than that with Hn=3 mm or smaller (good with Hn=5.5 mm).

According to the measurement results shown in FIG. 16 to FIG. 20, with respect to the good-cutting tolerant focal range, the nozzle height difference Hn=1 mm or larger is preferable, because it is equivalent-to or better-than that with Hn=0. Especially, the nozzle height difference Hn=5.5 mm is further preferable, because it provides the best good-cutting tolerant focal range among the measurement results with the Hn=1 mm or larger.

On the other hand, with respect to the dross height, no common tendency is found in comparison between the nozzle height difference Hn=0 and Hn=1 mm or larger. However, the nozzle height, difference Hn=5.5 mm is preferable, because it is equivalent-to or better-than Hn=3 mm or smaller. Therefore, in consideration of the good-cutting tolerant focal range and the dross height, it is preferable to at least set the nozzle height difference Hn=1 mm or larger, and it is further preferable to set Hn=5.5 mm.

The above-explained cutting conditions can be used for other iron-based materials, such as SPCC (cold rolled steel), than SUS, SPH and SS used in the above measurements, and can provide similar effects. In addition, lasers oscillated by the laser oscillator 6 are not limited to fiber lasers. Lasers oscillated by the laser oscillator 6 may be direct diode lasers whose wavelength is about $\frac{1}{10}$ of that of $CO_2$ lasers. Advantages equivalent to those brought by fiber lasers can be brought also by direct diode lasers.

(Local Maximum of Dross Height)

In the measurement results explained with referring to FIG. 4 to FIG. 6, the maximum cutting speed Vmax gets smaller and the dross height gets larger, as the gas pressure Pn gets larger. In consideration of dross generation due to coolant effects of the assist gas AG, a flow volume and a flow rate of the assist gas AG gets larger as the gas pressure Pn gets larger and thereby cooling of melted metal in a kerf is promoted. As the result, viscosity of the melted metal increases and the melted metal gets less ejected from the kerf, so that the height of the dross gets larger. However, if the thickness t is large, the assist gas AG is restricted from flowing through a kerf and thereby cooling of melted metal in the kerf is promoted.

When cutting of a workpiece W with a thickness t=6 to 20 mm under the above-mentioned measurement conditions, the cooling promotion of melted metal in a kerf gets more ascendant than the ejection of the melted metal due to a gas flow as the thickness t gets smaller, and thereby the dross height is restricted. On the other hand, as the thickness t gets larger, the cooling promotion of melted metal in a kerf is restricted and the ejection of the melted metal due to a gas flow gets more ascendant similarly, and thereby the dross height is restricted. Therefore, if the thickness t is an intermediate thickness, the cooling promotion of melted metal in a kerf gets more ascendant than the ejection of the melted metal due to a gas flow, and thereby a viscosity of the melted metal gets larger. As the result, it is assumed that there may be a case where the ejection of the melted metal is restricted and thereby the dross height gets larger.

As explained above, when a range of a thickness t that brings a local maximum of the dross height can be confirmed preliminarily, good cutting can be done with respect to the range by making the output power M of the laser lights Ls large. Or, good cutting can be done with respect to the range by making the gas pressure Pn large as explained with reference to FIG. 12 and so on.

(Assist Gas AG)

The assist-gas supply device 7 in the present embodiment supplies 99.999% pure nitrogen gas as the assist gas AG from the tank. Nitrogen gas may be purified through a filter from atmosphere and then supplied. In this case, oxygen can be contained in the assist gas AG at an arbitrary rate (e.g. a few percent).

When cutting mild steel by using nitrogen-rich assist gas AG including a few percent oxygen together with laser lights Ls, oxidation reaction heats are generated during the cutting. The oxidation reaction heats restrict cooling of melted metal achieved by a flow of the assist gas AG and thereby increase of the viscosity of the melted metal is restricted. As the result, it is assumed that ejection of the melted metal from a kerf is promoted and thereby the dross height gets small. Namely, good cutting explained with reference to FIG. 4 to FIG. 6 can be done with the gas pressure Pn=0.8 MPa or larger.

By the laser processing apparatus 51 according to the present embodiment, good cutting of an iron-based thick plate material can be done at least with the gas pressure Pn=0.4 to 0.6 MPa. In addition, in a case of adjusting the gap Gp according to a thickness t, good cutting of an iron-based thick plate material can be done at least with the gas pressure Pn=0.4 to 0.8 MPa. Pn=0.4 to 0.6 MPa is generally equivalent to a gas pressure for piercing. Therefore, it is required in a conventional processing to change a gas pressure for piercing to a higher pressure for cutting, but it can be done without changing a gas pressure. Namely, shifting of the gas pressure Pn conventionally done between piercing and cutting is not needed. According to this, a stabilization period required after shifting the gas pressure Pn can be eliminated, and thereby processing efficiency can be improved.

(Modified Examples)

The laser processing method and apparatus are not limited to processes and configurations of the present embodiment, and can be modified within a scope that doesn't depart from the subject matter.

Figure 21:
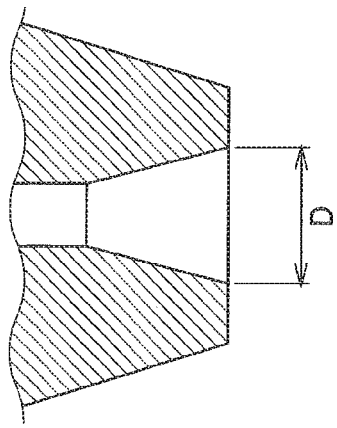
FIG. 21($a$)-($e$) are vertical cross-sectional views showing examples of a nozzle shape.
Figure 21:
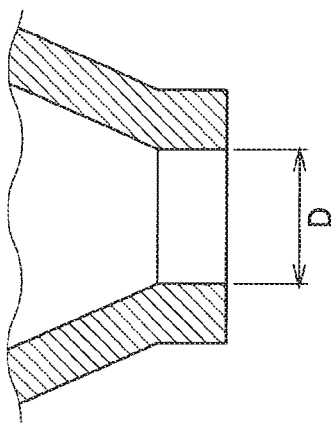
Figure 21:
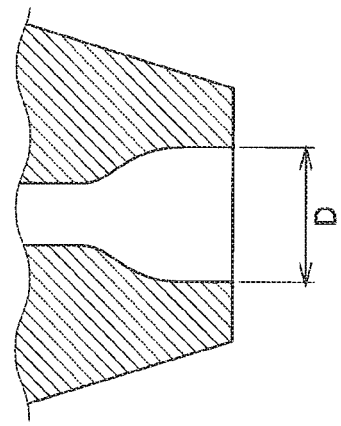
Figure 21:
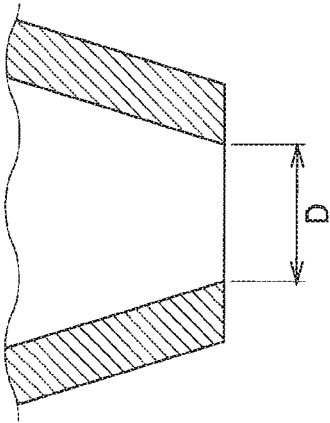
Figure 21:
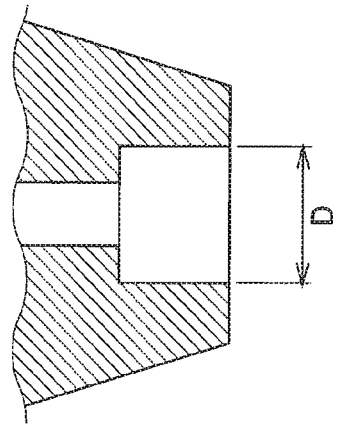

The nozzle 2b may not be a double nozzle, but may be a single nozzle. Since an assist gas consumption volume Q is made smaller by a double nozzle than by a single nozzle, it is preferable to use a double nozzle as the nozzle 2b. In addition, with in the nozzle 2b, a space Va whose inner diameter shifts may be formed instead of the space Va with a constant inner diameter (see FIG. 2). In this case, it is enough that the space Va whose inner diameter shifts gradually without steeply shifting at a vicinity of its tip end 2b1 is formed in the inside of the nozzle 2b (see nozzles having various shapes shown as examples in FIG. 21), and the formation of the space Va can bring equivalent advantages.

The cutting performance may be evaluated not based on the dross height, but based on surface roughness of a cutting surface. In addition, the laser processing apparatus 51 may not be provided with the nozzle changer 8. In this case, the nozzle selector 14 may notify the nozzle number to an operator from an output device 15 (see FIG. 1) by sounds or images (output of nozzle information). It is preferable to notify the nozzle number by the output device 15 also in a case where the nozzle 2b can be automatically changed by the nozzle changer 8.

[Embodiment 2]

Next, explained will be an embodiment 2 in which good cutting is done by using the nozzle 2b of the embodiment 1 and nitrogen-rich assist gas AG1 as assist gas AGG (the 99.999% pure nitrogen gas is used as the assist gas AG in the embodiment 1 [anoxic cutting]). A laser processing apparatus 51 and a laser processing method according to the embodiment 2 will be explained.

Figure 22:
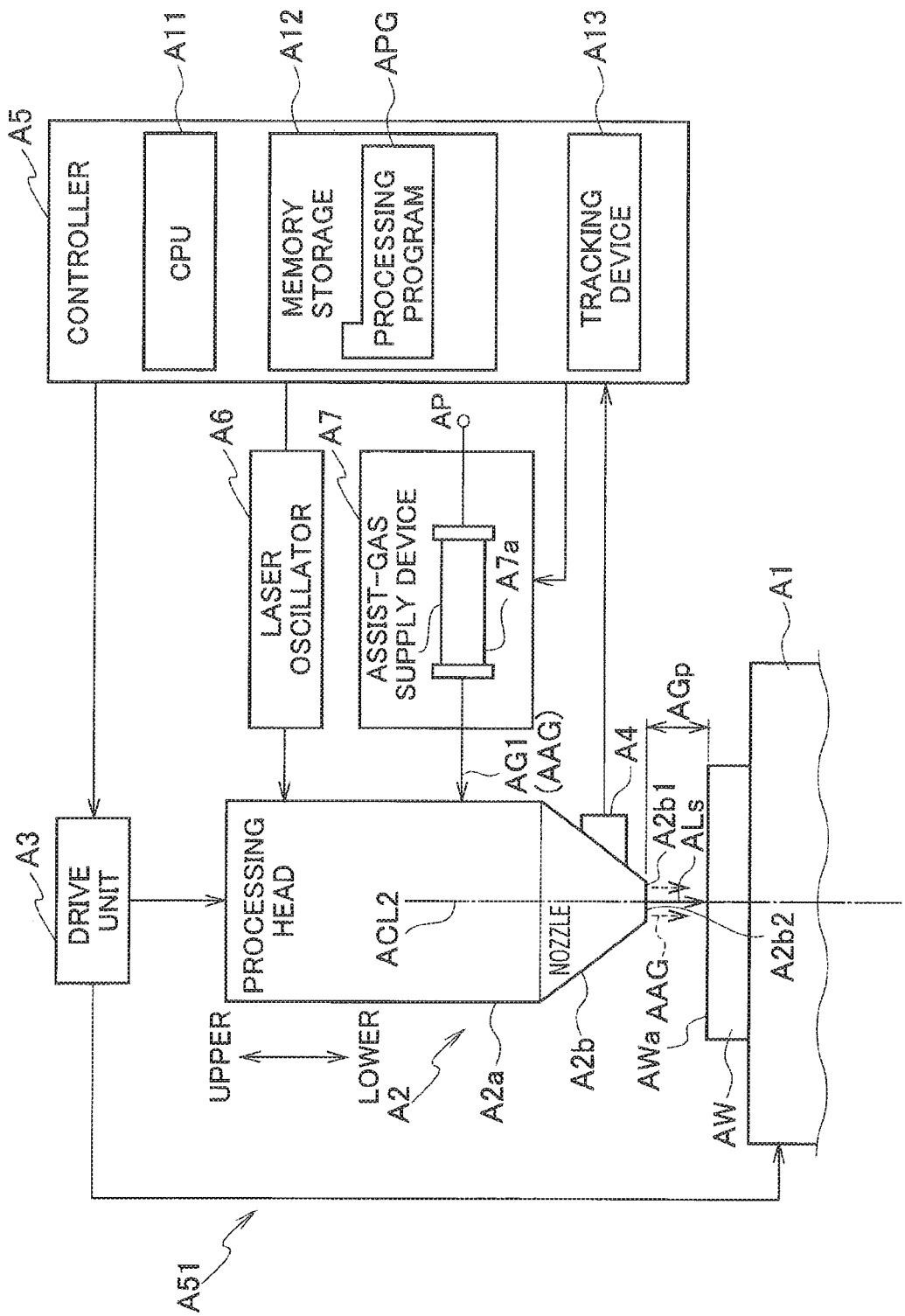
FIG. 22 is a schematic configurational diagram of a laser processing apparatus A51 according to an embodiment 2.

As shown in FIG. 22, the laser processing apparatus 51 includes a work table A1, a processing head A2, a drive unit A3 and a controller A5. A workpiece AW that is a plate material is laid on the work table A1. The processing head A2 irradiates laser lights ALs onto the workpiece AW that is a plate material laid on the work table A1. The drive unit A3 moves at least one of the work table A1 and the processing head A2 to change three-dimensional relative position between the two. The controller A5 controls operations of the processing head A2 and the drive unit A3.

In addition, the laser processing apparatus 51 includes a laser oscillator A6 and an assist-gas supply device A7. The laser oscillator 6 supplies the laser lights ALs of fiber lasers to the processing head A2. The laser oscillator 6 outputs the laser lights having a 1 μm-band wavelength to supply them to the processing head A2. The lasers oscillated by the laser oscillator A6 are not litited to fiber lasers, and may be DDL (direct diode lasers) or disc laser. In a case where the laser oscillator 6 is a fiber laser oscillator, the fiber laser oscillator outputs laser lights having a wavelength 1060 nm-1080 nm. In a case where the laser oscillator 6 is a DDL oscillator, the DDL oscillator outputs laser lights having a wavelength 910 nm-950 nm.

The assist-gas supply device A7 supplies nitrogen-rich gas AAG1 to the processing head A2 as the assist gas AAG. The assist-gas supply device A7 includes a gas separation unit A7a having a gas separation membrane filter (hollow fiber membrane filter). The assist-gas supply device A7 is a known gas supply device that outputs nitrogen-rich gas AAG1 as assist gas AAG. Note that the nozzle 2Ab in the present embodiment may be a single nozzle that is different from the above-explained nozzle 2b. The assist gas AAG in the present embodiment is the nitrogen-rich gas AAG1 containing oxygen, and reaction heats of nitrogen and oxygen contribute to cutting while the workpiece AW is being cut. Namely, since that the assist gas AAG doesn't merely cool the workpiece AW, the nozzle A2b may be a single nozzle.

The controller A5 is configured by including a central processing unit (CPU) A11, a memory storage A12 and a tracking control unit A13. A processing program(s) APG for cutting the workpiece AW is supplied to the controller A5 from external via a communication interface (not shown in the drawings) or the like and then stored in the memory storage 12. The CPU A11 controls operations of the laser oscillator A6 and the drive unit A3 so that the laser lights ALs is irradiated onto the workpiece AW along a cutting path specified by the processing program PG. The laser lights ALs are irradiated downward through an opening A2b2 (irradiation opening) formed at a tip end A2b1 of the nozzle A2b along an axial line ACL2. An inner diameter of the opening A2b2 is called as an opening diameter AD. The tip end A2b1, the opening A2b2 and the opening diameter AD of the nozzle A2b are associated with the tip end 2b1, the opening 2b2 and the opening diameter D of the nozzle A2b in the embodiment 1, respectively.

In a case of using the assist gas AAG when cutting the workpiece AW by the laser lights ALs, the CPU A11 controls supply operations of the assist gas AAG done by the assist-gas supply device A7. The assist gas AAG is injected downward from the opening A2b2 with a desired gas pressure as a flux having a given horizontal cross-sectional shape (flux having a circular cross-sectional shape, for example) including the axial line ACL2. Here, the gas pressure is controlled as a pressure in a main body A2a of the processing head A2 by the controller A5 by using the assist-gas supply device A7, for example.

Figure 23:
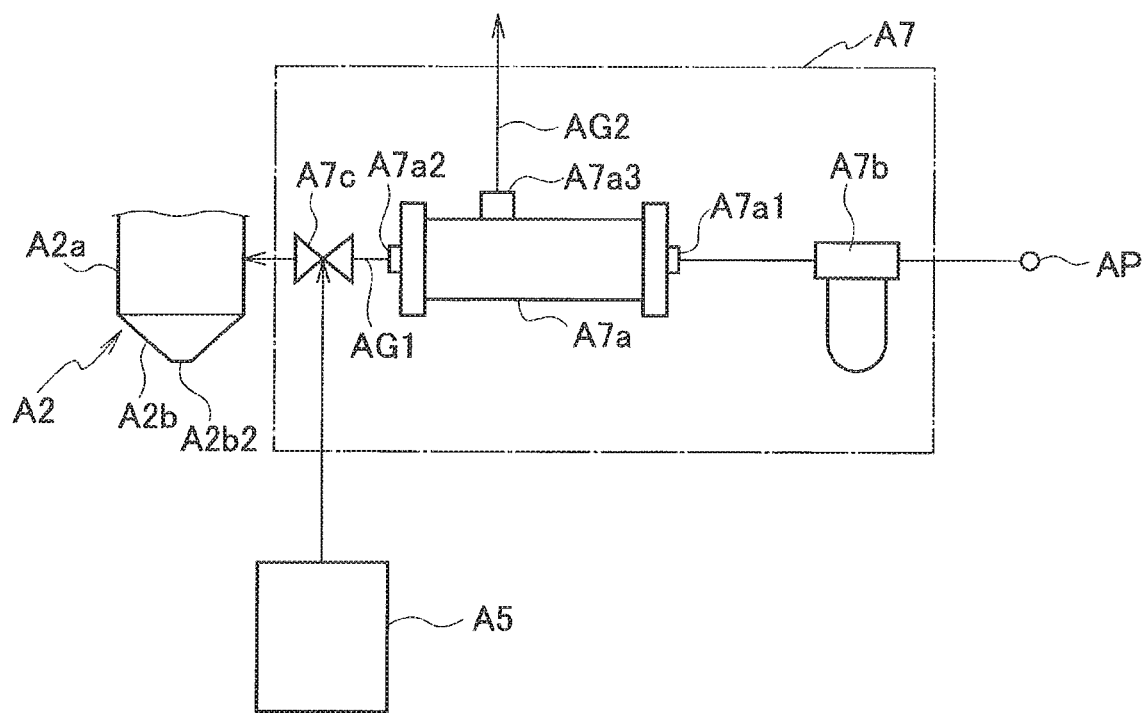
FIG. 23 is a configurational diagram of an assist-gas supply device A7 of the laser processing apparatus A51.

As shown in FIG. 23, the assist-gas supply device A7 includes a dust collection filter A7b, a gas separation unit A7a and an electromagnetic on-off valve A7c sequentially from an upstream side of a flow passage (a right side in FIG. 23). The dust collection filter A7b is connected to a compressed air line AP with almost 1.0 MPa routed in a factory, for example. The dust collection filter A7b removes dusts in high-pressure air flowing thereinto. The high-pressure air from which dusts are removed is flows into an inlet port A7a1 of the gas separation unit A7a. The supply of the compressed air to the assist-gas supply device A7 may be done, not by the compressed air line AP, by a compressor provided independently from the compressed air line AP.

The gas separation unit A7a has the gas separation membrane filter (hollow fiber membrane filter) as explained above, and separates oxygen from air by use of sizes of their molecules. Therefore, the nitrogen-rich gas AG1 from which oxygen is removed flows out through an outlet port A7a2. In addition, oxygen-rich gas AG2 separated therefrom flows out through an outlet port A7a3. Generally, although depending on a supply pressure of compressed air and age-related degradation of a hollow fiber membrane filter, nitrogen purity of the nitrogen-rich gas AG1 generated by using a hollow fiber membrane filter is not smaller than 90% and smaller than 99.5% (volume rate). Most part other than the nitrogen-rich gas AG1 is generally oxygen that has not been separated. Namely, at least not smaller than 0.5% and smaller than 10% oxygen is contained in the nitrogen-rich gas AG1.

The purity of nitrogen is set in view of deterioration of the separation function of the filter along with the age-related degradation, and deteriorates in such a set range along with a usage period. Namely, life of the hollow fiber membrane filter ends when the nitrogen purity decreases to 90%. Mixing rate of oxygen gas in the nitrogen-rich gas AG1 is larger than that of high purity 99.999% or higher nitrogen gas prepared by using a nitrogen tank. Therefore, the nitrogen-rich gas AG1 can be regarded as mixed gas of nitrogen and oxygen, and thereby is called also as mixed gas AG1. In addition, the assist-gas supply device A7 is also a nitrogen-rich gas generation device that generates nitrogen-rich gas.

As a method for generating mixed gas of nitrogen and oxygen, there are a method in which mixing is done by using a nitrogen tank and atmosphere (or, a nitrogen tank and an oxygen tank) and a method in which nitrogen gas is got through a PSA (Pressure Swing Adsorption) method and then mixed with oxygen from atmosphere (or, an oxygen tank). According to such a method, an expensive nitrogen tank or a PSA machine is required. However, the gas pressure of the assist gas used in the method according to the present embodiment is not larger than 1.0 MPa as explained later. Therefore, consumption costs of the assist gas in the present embodiment becomes smaller than that in the conventional processing method in which expensive nitrogen gas is used at high pressure over 1.0 MPa.

The mixed gas AG1 flowing out from the outlet port A7a2 is supplied to the main body A2a of the processing head A2 through the electromagnetic on-off valve A7c. The operation of the electromagnetic on-off valve A7c is controlled by the controller A5.

The assist-gas supply device A7 generates the nitrogen-rich mixed gas AG1 from high-pressure air with almost 1.0 MPa from the compressed air line AP as explained above, and then injected from the opening A2b2 of the nozzle A2b without increasing its pressure. The pressure of the mixed gas AG1 after passing through the gas separation unit A7a gets smaller than the air pressure of the compressed air line AP, i.e. not more than 1.0 MPa.

As explained above, the nitrogen-rich assist gas AAG generated from air without using a nitrogen tank is generated as the mixed gas AG1, and the generated mixed gas AG1 is injected with the gas pressure smaller than 1.0 MPa. If good cutting can be done by the mixed gas AG1, an expensive tank is not required. In addition, an injected volume becomes smaller due to a low gas pressure, and thereby costs for laser cutting reduces.

Tests are done for conditions enabling good cutting of an iron-based plate material by using the mixed gas AG1 generated from air by the assist-gas supply device A7 as the assist gas AAG with the gas pressure=0.6 MPa that is enough lower than a conventional pressure. In addition, cutting performance and an optimum cutting speed AV (m/min) are evaluated under the conditions enabling good cutting.

A thickness At and material of a plate material used in the tests and fixed conditions are shown below.
Thickness At: 1.6 mm, 3.2 mm, 4.5 mm, 6.0 mm, 9.0 mm
Material: SPH (hot-rolled sheet steel plate)
<Fixed Conditions>
Gas pressure: 0.6 MPa
Output power of laser lights: 6 kW
Nozzle height difference Hn (see FIG. 2): 5.5 mm
Gap AGp: 0.3 mm Cutting performance is evaluated based on the above-explained dross height (the maximum size of the dross) from a surface opposite to the nozzle A2b (a bottom face) at a cut portion of the workpiece AW. When the dross height takes a preliminarily-set. criteria value required as a product or lower, cutting performance is good.

As the results of the rests, it becomes obvious that good cutting of the workpiece AW with each thickness At can be done by selecting the nozzle A2b having the opening diameter AD associated with the thickness At. Relations between the thickness At and the opening diameter AD of the nozzle A2b enabling good cutting are shown below.

| (Thickness At) | (Opening Diameter AD) |
|---|---|
| 1.6 mm | 4 mm |
| 3.2 mm-6.0 mm | 7 mm |
| 9.0 mm | 10 mm |

Figure 24:
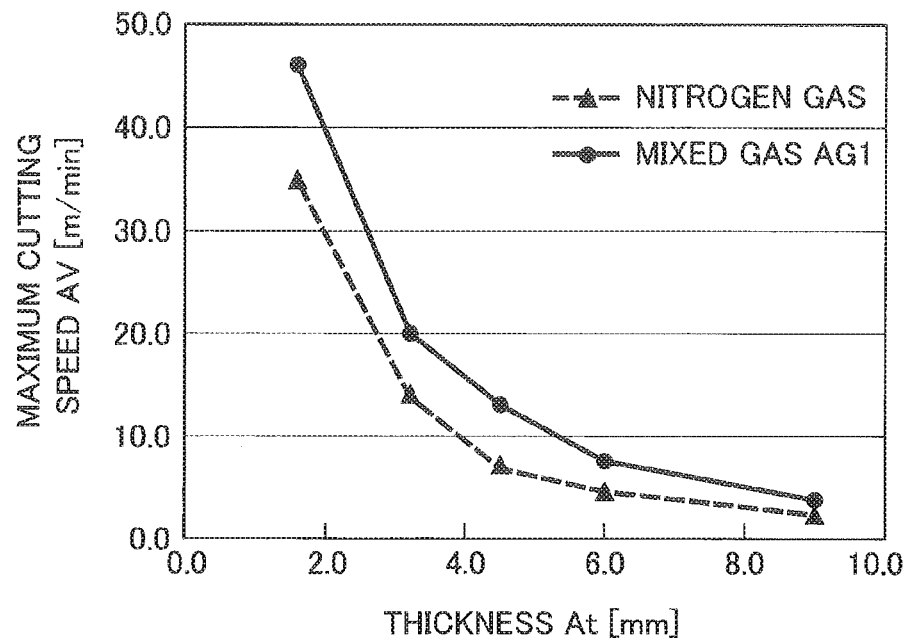
FIG. 24 is a graph showing relation between a thickness At and an optimum cutting speed AV.

Further, the optimum cutting speed AV (m/min) that brings best cutting performance for each thickness At is found with these conditions, and the optimum cutting speed AV is presented by a graph in FIG. 24 in which a horizontal axis is the thickness At and a vertical axis is the cutting speed AV. In the graph, relation between the thickness At (horizontal axis) and the optimum cutting speed AV (vertical axis) with respect to the above-explained mixed gas AG1 is indicated by a solid line.

In the graph of FIG. 24, relation between the thickness At and the optimum cutting speed AV that enables good cutting by purity 99.999% or higher nitrogen gas is also indicated by a dashed line. Here, an identical material is cut under following default conditions set in association with the thicknesses At. In addition, the output power AM of the laser lights is 6 kW that is identical to that in a case of the mixed gas AG1.
<Default Conditions>

| (Thickness At) | (Opening Diameter AD) | (Gas pressure) |
|---|---|---|
| 1.6 mm | 2.0 mm | 1.2 MPa |
| 3.2 mm | 2.5 mm | 1.8 MPa |
| 4.5 mm, 6.0 mm | 4.0 mm | 1.6 MPa |
| 9.0 mm | 7.0 mm | 1.5 MPa |

As being obvious from FIG. 24, cutting by using the mixed gas AG1 enables good cutting with a higher optimum cutting speed AV than that by using the nitrogen gas within the range of the thickness AT 1.6 to 9.0 mm. Since a faster optimum cutting speed with an identical gas pressure enables cutting of a given path within a shorter period, the consumption volume of the assist gas AAG becomes smaller. The gas pressure for the nitrogen gas takes 1.2 Mpa at lowest, but the gas pressure for the mixed gas AG1 takes 0.6 MPa that is not higher than a half thereof. Therefore, it is obvious that the consumption volume of the mixed gas AG1 (the assist gas AAG) is notably smaller than the consumption volume of the nitrogen gas.

Figure 25:
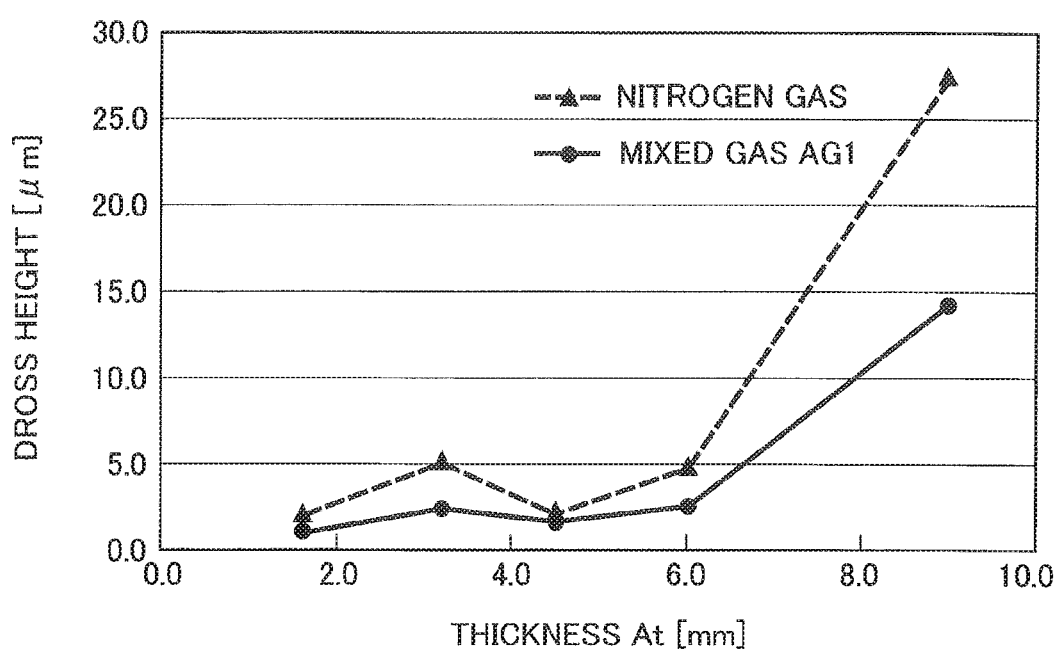
FIG. 25 is a graph showing relation between a thickness At and a dross height with respect to the optimum cutting speed AV.

FIG. 25 is a graph showing the dross height with each thickness At by the optimum cutting speed AV. Within an entire range of the thickness At 1.6 to 9.0 mm, the dross height of the mixed gas AG1 is smaller than the dross height of the nitrogen gas, and thereby it is known that cutting performance with the mixed gas AG1 is good. Especially, the dross height of the mixed gas AG1 is almost a half of the dross height of the nitrogen gas except the thickness At=4.5 mm with which the dross heights are almost the same, and thereby it is obvious that extremely good cutting performance can be brought.

The reason why cutting with the lower gas pressure, the higher cutting speed and the smaller dross height can be done with the mixed gas AG1 than those with the nitrogen gas is assumed as follows based on observations of a cut surface. Oxidation reaction is notably occurs on a cut portion when a volume rate of oxygen in the mixed gas AG1 is 0.5% or more, and thereby viscosity of melted metal in a kerf decreases due to the reaction heats and then a melted area expands further. Although a total amount of the melted metal increases due to the expansion of the melted area in the kerf, a heating effect due to the oxidation reaction heats in addition to the heats of the laser lights decreases the viscosity of the melted metal. Therefore, the melted metal is ejected out from the kerf even when the pressure of the assist gas AAG is low, and thereby the cutting speed gets fast.

In addition, a width of the kerf gets wide due to the expansion of the melted area in the kerf, and resistance received by the assist gas AAG in the kerf decreases. Therefore, it becomes possible to penetrate the assist gas AAG through the kerf even with a lower gas pressure, and the ejection of the melted metal in the kerf can be maintained. As the result, it becomes possible to decrease the gas pressure to 1 MPa or lower and decrease the dross height. Namely, cutting of an SPH material (hot-rolled sheet steel plate) that is a modestly-thick plate material or a thick plate material by using the nitrogen-rich mixed gas AG1 as the assist gas AAG with 1.0 MPa gas pressure or lower and by using the nozzle A2b whose opening diameter AD is larger than the default conditions, can brings a faster cutting speed and a smaller dross height (cutting performance improvement).

(Modified Examples)

The laser processing method and apparatus are not limited to processes and configurations of the present embodiment, and can be modified within a scope that doesn't depart from the subject matter.

The cutting performance may be evaluated not based on the dross height, but comprehensively based on combination of other items such as surface roughness of a cutting surface. In addition, the material that is cut is not limited to SPH, and the method and the apparatus according to the present embodiment can be similarly applied to an iron-based material including SPC (cold rolled steel), stainless steel and so on and the same advantages can be brought. Note that the gas pressure may not be 0.6 MPa, but the same advantages can be brought with at least not smaller than 0.6 MPa and not more than 1.0 MPa. Further, the controller A5 is not provided in the laser processing apparatus A51. For example, the controller A5 may be disposed at a vicinity of the laser processing apparatus A51 or at a remote location, and may communicates with the laser processing apparatus A51 by a wired or wireless communication.

The laser processing apparatus A51 may have following configurations. Namely, the laser processing apparatus A51 has a laser oscillator A6 that generates laser lights having a 1 μm-band wavelength, and an assist-gas supply device A7 that serves as a nitrogen-rich gas generation device for generating nitrogen-rich gas AG1 whose oxygen purity is not smaller than 0.5% and smaller than 10%. The laser processing apparatus A51 further sets an opening diameter AD of a nozzle A2b for a given thickness At, and has a memory storage A12 for storing preliminarily confirmed processing conditions for each thickness At. The stored processing conditions include an optimum cutting speed AV. Here, the optimum cutting speed AV is a cutting speed that can brings cutting capability and the best cutting performance when cutting a workpiece AW that is an iron-based material by laser lights ALs, by using the nitrogen-rich gas AG1 whose oxygen purity is not smaller than 0.5% and smaller than 10% as assist gas AG from the assist-gas supply device A7, while injecting the assist gas AG with a gas pressure that is 1.0 MPa or lower. Then the laser processing apparatus A51 includes a controller A5 that selects processing conditions associated with the thickness At to be processed next from the processing conditions stored in the memory storage A12 and controls operations of the laser oscillator A6, the assist-gas supply device A7 and the processing head A2 based on the selected processing conditions.

The invention claimed is:

1. A laser processing method comprising:
irradiating an iron-based plate material with laser lights of fiber lasers or direct diode lasers from one of a plurality of nozzles whose nozzle openings have different opening diameters from each other;
selecting one of the plurality of nozzles to be used for irradiating the iron-based plate material with the laser lights that has a nozzle opening with an opening diameter preliminarily set according to a thickness of the plate material; and
cutting the iron-based plate material by injecting assist gas with a gas pressure of 0.4 to 1.0 MPa from the nozzle opening of the selected nozzle while irradiating the iron-based plate material with the laser lights, wherein
a nozzle selection table is made preliminarily and specifies opening diameters of the plurality of nozzles that produce good cutting of iron-based plate materials of different thicknesses with the gas pressure of 0.4 to 1.0 MPa with respect to each output power of the laser lights,
the nozzle selection table specifies more than one of the plurality of nozzles of different opening diameters produce good cutting of the iron-based plate material of a same thickness with the gas pressure of 0.4 to 1.0 MPa, the more than one of the plurality of nozzles are denoted as plural nozzles that produce good cutting of the iron-based plate material of the same thickness with the gas pressure of 0.4 to 1.0 MPa,
the selected one of the plurality of nozzles is selected from the plural nozzles,
the plural nozzles of different opening diameters each cut the iron-based plate material of the same thickness at a cutting speed with the gas pressure of 0.4 to 1.0 MPa, and one of the plural nozzles of different opening diameters achieves a maximum cutting speed for cutting the iron-based plate material of the same thickness with the gas pressure of 0.4 to 1.0 MPa compared to the cutting speed of the other plural nozzles for cutting the iron-based plate material of the same thickness with the gas pressure of 0.4 to 1.0 MPa, and the selecting operation selects the one of the plural nozzles that achieves the maximum cutting speed for cutting the iron-based plate material of the same thickness with the gas pressure of 0.4 to 1.0 MPa according to the nozzle selection table that specifies the plural nozzles of different opening diameters that produce good cutting of the iron-based plate material of the same thickness with the gas pressure of 0.4 to 1.0 MPa.

2. The laser processing method according to claim 1, wherein, the iron-based plate material includes a first iron-based plate material and a second iron-based plate material, the cutting includes a first cutting for cutting the first iron-based plate material and a second cutting for cutting the second iron-based plate material, the second cutting for cutting the second iron-based plate material is to be done after the first cutting for cutting the first iron-based plate material and a first thickness of the first iron-based plate material is different from a second thickness of the second iron-based plate material, and the second cutting is done by changing at least one of the opening diameter of the nozzle used in the first cutting and an output power of the laser lights based on comparison of the second thickness with the first thickness.

3. The laser processing method according to claim 1, wherein, the iron-based plate material includes a first iron-based plate material and a second iron-based plate material, the cutting includes a first cutting for cutting the first iron-based plate material and a second cutting for cutting the second iron-based plate material, the second cutting for cutting the second iron-based plate material is to be done after the first cutting for cutting the first iron-based plate material and a first thickness of the first iron-based plate material is equal to a second thickness of the second iron-based plate material, and the second cutting is done by making one of the opening diameter of the nozzle and an output power of the laser lights used in the first cutting larger in the second cutting and making the other of opening diameter of the nozzle and the output power of the laser lights used in the first cutting smaller in the second cutting.

4. The laser processing method according to claim 1, wherein one of the plurality of nozzles is a double nozzle having an outer nozzle and an inner nozzle, and the nozzle opening of the one of the plurality of nozzles being a double nozzle is an opening of the outer nozzle and an opening of the inner nozzle and is positioned on a deep-set side from the opening of the outer nozzle along an axial line of the nozzle.

5. The laser processing method according to claim 1, wherein the iron-based plate material is made of stainless steel, and the assist gas is injected with a gas pressure of 0.4 to 0.8 MPa.

6. The laser processing method according to claim 1, wherein the maximum thickness of the iron-based plate material subjectable to good cutting depends on the opening diameter of the one of the plurality of nozzles.

7. The laser processing method according to claim 1, wherein a cutting tolerant thickness saturates when the nozzle opening diameter is 10 mm or larger so nozzles having an opening diameter greater than 10 mm produce good cutting only of iron-based plate materials whose thickness is no larger than the thickness of iron-based plate materials on which good cutting is achieved by a nozzle having an opening diameter of 10 mm, and wherein the nozzle selection table identifies nozzles having an opening diameter greater than 10 mm as producing good cutting only of iron-based plate materials whose thickness is no larger than the thickness of iron-based plate materials on which good cutting is achieved by a nozzle having an opening diameter of 10 mm.

8. The laser processing method according to claim 1, wherein the nozzle selection table specifies each of the plurality of nozzles with different opening diameters ranging from 2 mm to 12 mm as producing good cutting of the iron-based plate material for the iron-based plate material having a thickness of 10 mm, thereby rendering each of the plurality of nozzles as selectable for the iron-based plate material having a thickness of 10 mm.

9. The laser processing method according to claim 1, wherein the nozzle selection table specifies two of the plurality of nozzles having different opening diameters ranging from 7 mm to 12 mm as producing good cutting of the iron-based plate material for the iron-based plate material having a thickness of 20 mm, thereby rendering the two of the plurality of nozzles as selectable for the iron-based plate material having a thickness of 20 mm.

\* \* \* \* \*